US011610093B2

(12) United States Patent
Park

(10) Patent No.: US 11,610,093 B2
(45) Date of Patent: Mar. 21, 2023

(54) ARTIFICIAL INTELLIGENCE LEARNING METHOD AND OPERATING METHOD OF ROBOT USING THE SAME

(71) Applicant: LG ELECTRONICS INC., Seoul (KR)

(72) Inventor: Jihwan Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 777 days.

(21) Appl. No.: 16/490,231

(22) PCT Filed: May 31, 2019

(86) PCT No.: PCT/KR2019/006617
§ 371 (c)(1),
(2) Date: Aug. 30, 2019

(87) PCT Pub. No.: WO2020/241951
PCT Pub. Date: Dec. 3, 2020

(65) Prior Publication Data
US 2021/0326673 A1    Oct. 21, 2021

(51) Int. Cl.
*G06N 3/00* (2006.01)
*G06N 3/08* (2006.01)
*G06V 20/10* (2022.01)
*G06V 40/20* (2022.01)
*G06N 3/008* (2023.01)

(52) U.S. Cl.
CPC ............. *G06N 3/008* (2013.01); *G06N 3/08* (2013.01); *G06V 20/10* (2022.01); *G06V 40/23* (2022.01)

(58) Field of Classification Search
CPC ........ G06N 3/008; G06N 3/08; G06N 3/0454; G06N 3/084; G06V 20/10; G06V 40/23; G06V 10/82; G06K 9/6271
See application file for complete search history.

(56) References Cited

U.S. PATENT DOCUMENTS

2013/0226344 A1    8/2013  Wong et al.
2015/0319424 A1*  11/2015  Haimovitch-Yogev ......................
                                                H04N 13/282
                                                348/48
2017/0134694 A1*   5/2017  Cho ...................... G06V 40/176
(Continued)

FOREIGN PATENT DOCUMENTS

EP    3 438 872      2/2019
JP    2015-518188    6/2015
(Continued)

OTHER PUBLICATIONS

International Search Report dated Mar. 4, 2020 issued in Application No. PCT/KR2019/006617.

*Primary Examiner* — Nasim N Nirjhar
(74) *Attorney, Agent, or Firm* — Ked & Associates LLP

(57) ABSTRACT

Disclosed are an artificial intelligence learning method and an operating method of a robot using the same. An on-screen label is generated based on image data acquired through a camera, an off-screen label is generated based on data acquired through other sensors, and the on-screen label and the off-screen label are used in learning for action recognition, thereby raising action recognition performance and recognizing a user's action even in a situation in which the user deviates from a camera's view.

8 Claims, 13 Drawing Sheets

(56) References Cited

U.S. PATENT DOCUMENTS

| | | | |
|---|---|---|---|
| 2017/0242478 A1 | 8/2017 | Ma | |
| 2017/0368413 A1* | 12/2017 | Shavit | A61B 5/1123 |
| 2019/0021568 A1 | 1/2019 | Kim | |
| 2019/0077007 A1* | 3/2019 | Mallinson | A61B 5/1124 |
| 2019/0289372 A1* | 9/2019 | Merler | H04N 21/44 |

FOREIGN PATENT DOCUMENTS

| | | |
|---|---|---|
| KR | 10-2012-0114670 | 10/2012 |
| KR | 10-2018-0122247 | 11/2018 |
| KR | 10-2019-0010303 | 1/2019 |
| KR | 10-2019-0034021 | 4/2019 |

* cited by examiner

ARTIFICIAL INTELLIGENCE LEARNING METHOD AND OPERATING METHOD OF ROBOT USING THE SAME

CROSS-REFERENCE TO RELATED PATENT APPLICATIONS

This application is a U.S. National Stage Application under 35 U.S.C. § 371 of PCT Application No. PCT/KR2019/00617, filed May 31, 2019, whose entire disclosure is hereby incorporated by reference.

TECHNICAL FIELD

The present invention relates to an artificial intelligence, a learning method using the same, a robot using the same and an operating method thereof, and more particularly, to an effective artificial intelligence learning method, a robot using the same and an operating method thereof.

BACKGROUND ART

Recently, interest in artificial intelligence (AI) and machine learning, such as deep learning, is greatly increasing.

Conventional machine learning has focused on classification, regression and clustering models based on statistics. Particularly, in supervised learning of the classification and regression models, features of training data and a learning model to discriminate new data based on these features are defined by humans. Differently, in deep learning, computers themselves find and determine features.

One of factors to accelerate development of deep learning may be open-source deep learning frameworks. As the deep learning frameworks are opened to the public, in order to achieve effective learning and recognition, a learning process, a learning method and extraction and selection of data used in learning in addition to deep learning algorithms become more important.

Further, research to apply artificial intelligence and machine learning to various products and services is increasing.

Robots have been developed for industrial use and been in charge of a part of factory automation. Recently, application fields of robots are further enlarged, and thus, medical robots, aerospace robots, etc. are developed and home robots which may be used in homes are produced. Among these robots, a robot which may autonomously travel is referred to as a mobile robot or an autonomously travelling robot.

As use of robots increases, demand for robots which may not only repeatedly perform simple functions but also provide information, entertainment and services increases. Further, an interaction unit between humans and robots and surrounding situation recognition technology of robots are diversified.

For example, related art document 1 (Korean Patent Unexamined Publication No. 10-2012-0114670, Publication Date of Oct. 17, 2012) discloses a robot cleaner including a voice recognition unit which recognizes a user's voice signal and executes control instructions corresponding to the recognized voice signal.

Further, related art document 2 (U.S. Patent Publication No. 2017/0242478, Publication Date of Aug. 24, 2017) discloses a device for interacting with a user, which detects whether or not a human is present in a predefined proximity region through a sensor, detects a user's visual attention and thus enters an interaction mode.

In related art document 1, voice input is performed in only one direction from the user to the robot cleaner, and thus used only to be added to or replace an operation to press a button or manipulate a remote controller.

Further, in related art document 2, a direction of visual attention is detected only within the predefined proximity region and it is difficult to recognize situations and actions other than detection of the direction of visual attention.

Further, in case of a method for recognizing situations and actions depending on a camera, when a situation or an action deviates from a camera's view, cognitive performance is greatly lowered.

DISCLOSURE

Technical Problem

Therefore, the present invention has been made in view of the above problems, and it is an object of the present invention to provide an artificial intelligence which may recognize a human action, and a learning method using the same.

It is a further object of the present invention to provide an artificial intelligence which may recognize action recognition performance and recognize an action of a human even in a situation in which the human deviates from a camera's view, and a learning method using the same.

It is another object of the present invention to provide a robot which may accurately recognize a human's action based on machine learning, and an operating method thereof.

It is yet another object of the present invention to provide a robot which may effectively perform machine learning and extract data used in action recognition, and an operating method thereof.

It is still another object of the present invention to provide a robot which may interact with a human based on a result of action recognition, and an operating method thereof.

Technical Solution

In accordance with an aspect of the present invention, the above and other objects can be accomplished by the provision of an artificial intelligence learning method and an operating method of a robot using the same, in which an on-screen label is generated based on image data acquired through a camera, an off-screen label is generated based on data acquired through other sensors, and the on-screen label and the off-screen label are used in learning for action recognition, so as to raise action recognition performance and recognize an action of a user even in a situation in which the user deviates from a camera's view.

In accordance with another aspect of the present invention, there is provided an artificial intelligence learning method including receiving data acquired through an image acquisition unit including one or more cameras and a sensor unit including one or more sensors, generating, when a user's action is detected from image data including a user, acquired by the one or more cameras, an on-screen label based on the image data including the user, generating an off-screen label based on sensing data acquired by the sensor unit when the image data including the user is acquired by the one or more cameras, and training an artificial intelligence configured to recognize human actions based on the on-screen label and the off-screen label.

In the generating the on-screen label, the on-screen label may be generated based on the image data including the user and the sensing data.

In the generating the off-screen label, the off-screen label may be generated based on the sensing data and image data excluding the user.

The artificial intelligence learning method may further include generating the image data excluding the user by removing image data corresponding to the user from the image data including the user.

The image data excluding the user may be image data acquired from the same background at a different point in time from a point in time when the image data including the user is acquired.

The artificial intelligence learning method may further include detecting the user's action by deducing vertices of respective body regions of the user included in the image data acquired by the one or more cameras through a skeleton technique.

In the training the artificial intelligence, self-supervised learning may be performed using each of the on-screen label and the off-screen label as input data.

The artificial intelligence learning method may further include receiving data for recognition, recognizing the user's action based on the on-screen label, when the data for recognition includes the image data including the user, acquired through the one or more cameras, and recognizing the user's action based on the off-screen label, when the data for recognition does not include the image data including the user, acquired through the one or more cameras.

In accordance with a further aspect of the present invention, there is provided an operating method of a robot, including training artificial intelligence using an on-screen label generated based on image data including a user, and an off-screen label based on sensing data acquired through other sensors when the image data including the user is acquired through a camera, acquiring data for recognition through an image acquisition unit and a sensor unit, recognizing a user's action based on the on-screen label, when the data for recognition includes the image data including the user, acquired through the camera, and recognizing the user's action based on the off-screen label, when the data for recognition does not include the image data including the user, acquired through the camera.

In the training the artificial intelligence, self-supervised learning may be performed using each of the on-screen label and the off-screen label as input data, or the artificial intelligence may be updated by receiving artificial intelligence-related data acquired by performing the self-supervised learning using each of the on-screen label and the off-screen label as the input data.

The operating method may further include performing a corresponding motion based on the recognized action.

In the performing the corresponding motion based on the recognized action, a top cover may be rotated so that one surface thereof provided with an operation unit and a first display disposed thereon faces the user, based on the action recognized based on the off-screen label.

Otherwise, in the performing the corresponding motion based on the recognized action, a top cover and a main body may be rotated so that one surface of the top cover provided with an operation unit and a first display disposed thereon and a second display having a larger size than the first display face the user, based on the action recognized based on the off-screen label.

Advantageous Effects

At least one of embodiments of the present invention may provide an artificial intelligence and a learning method using the same in which a human's action may be recognized.

Further, at least one of the embodiments of the present invention may raise action recognition performance and recognize a user's action even in a situation in which a user deviates from a camera's view.

Moreover, at least one of embodiments of the present invention may provide a mobile robot and an operating method thereof in which a human's action may be accurately recognized based on machine learning.

In addition, at least one of embodiments of the present invention may provide a mobile robot and an operating method thereof in which machine learning may be performed effectively and data usable in action recognition may be extracted effectively.

Other various effects of the invention will be directly or implicitly set forth in the description of the embodiments of the invention which follows.

BEST MODE

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the following description of the embodiments, it will be understood that suffixes "module" and "unit" added to elements are used in consideration of only ease in preparation of the description, and the terms themselves do not give important significances or roles. Therefore, the suffixes "module" and "unit" may be used interchangeably.

In addition, in the following description of the embodiments, terms "first", "second", etc. may be used to describe various elements, and it will be understood that these terms do not limit the nature, sequence or order of the corresponding element. It will be understood that these terms are used only to discriminate one element from other elements.

Hereinafter, a mobile robot which may autonomously travel and provide a guidance service will be exemplarily illustrated, but the present invention is not limited thereto. For example, a security robot which provides a security service will be applied to the present invention. Further, a robot which is not autonomously movable may use an artificial intelligence, a learning method using the same and user's action recognition technology in accordance with the present invention except for contents regarding robot movement. Moreover, configuration of hardware and software of the mobile robot which will be exemplarily described below may be modified.

Figure 1:
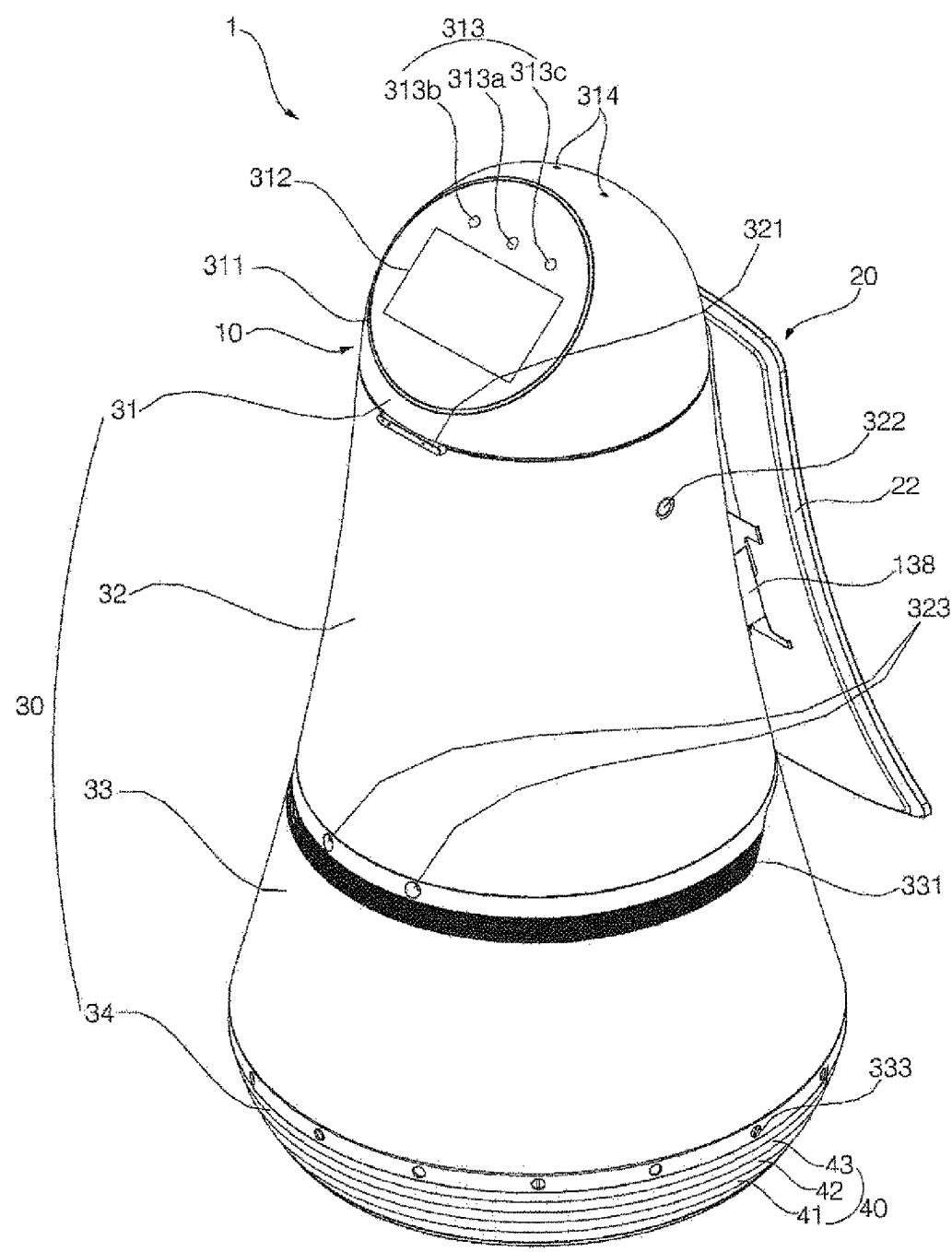
FIG. 1 is a perspective view of a mobile robot in accordance with one embodiment of the present invention.
Figure 2:
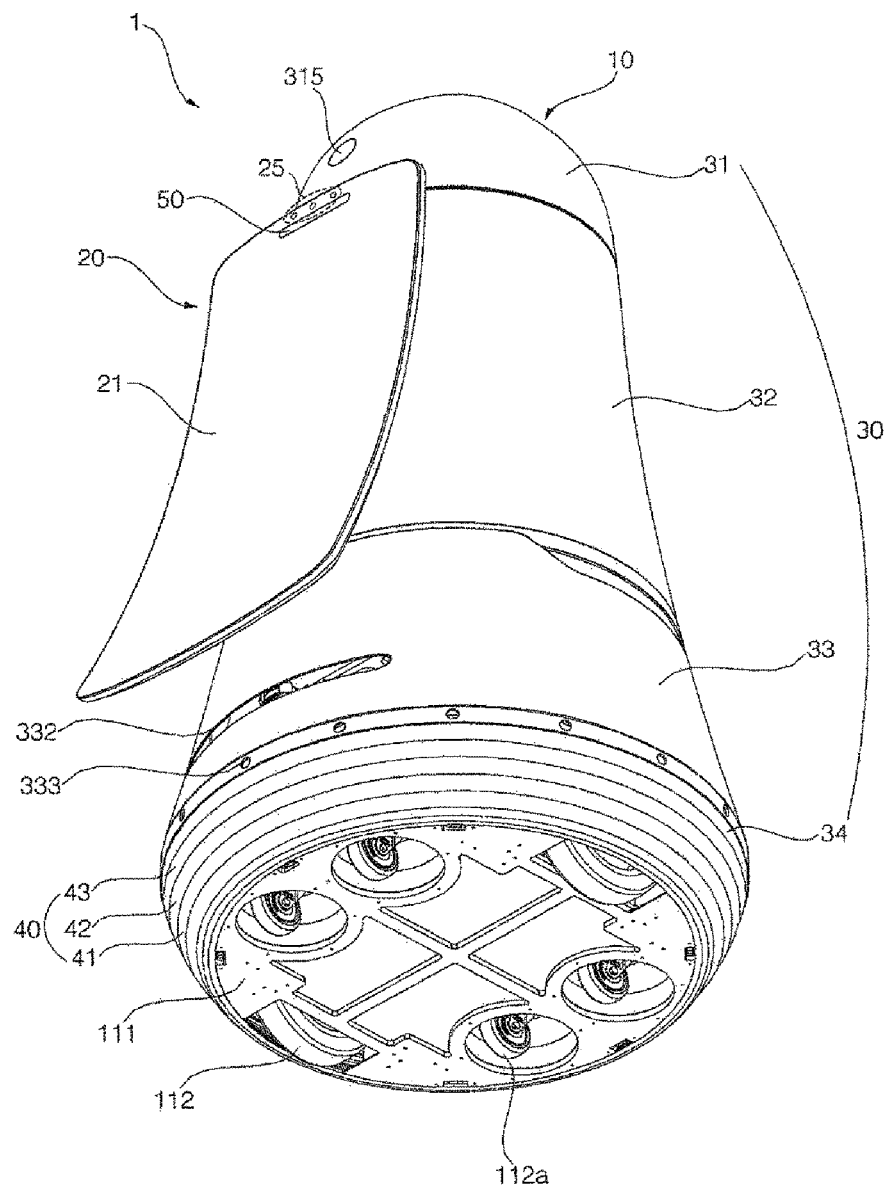
FIG. 2 is a perspective view of the mobile robot in accordance with one embodiment of the present invention, as seen from the bottom.
Figure 3:
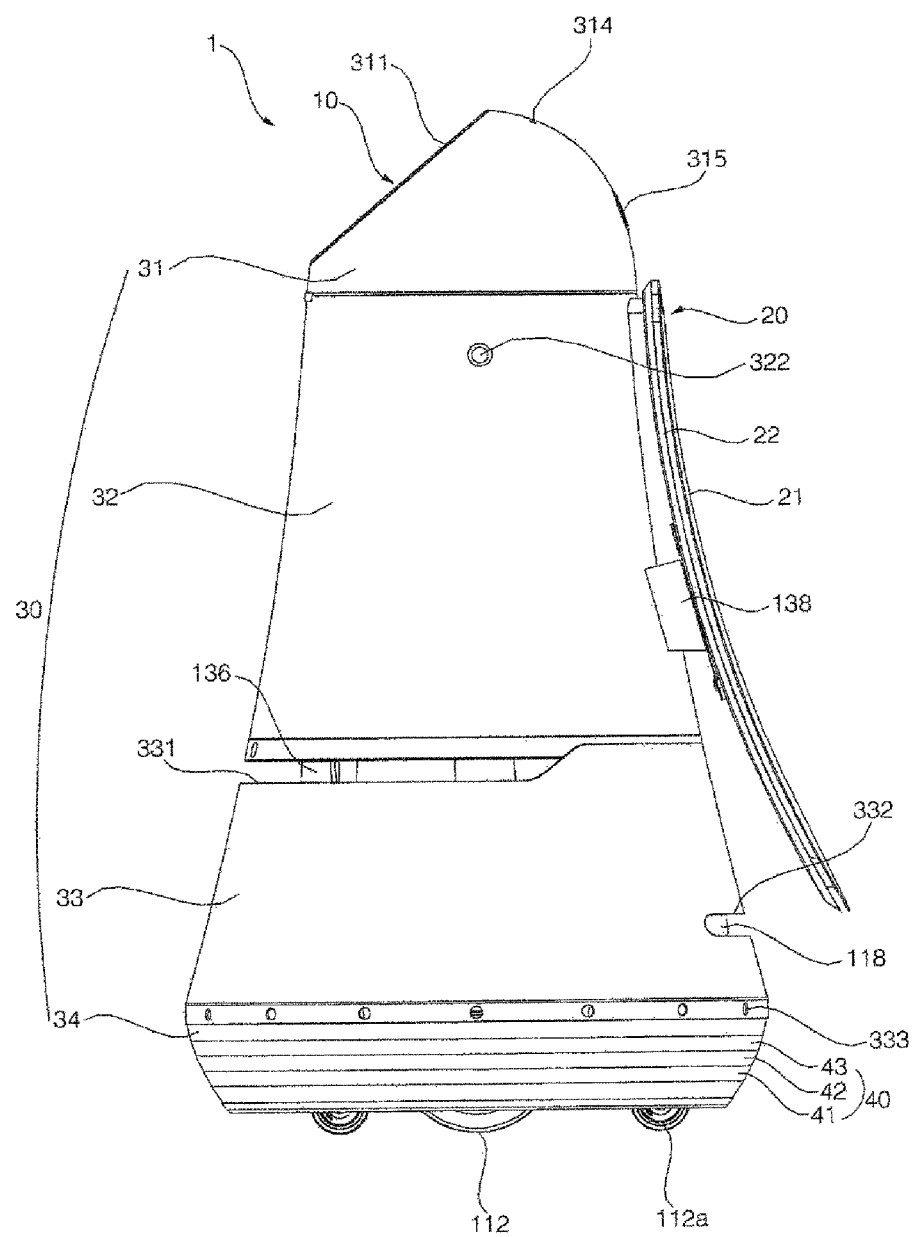
FIG. 3 is a side view of the mobile robot in accordance with one embodiment of the present invention.

FIG. 1 is a perspective view of a mobile robot in accordance with one embodiment of the present invention, FIG. 2 is a perspective view of the mobile robot in accordance with one embodiment of the present invention, as seen from the bottom, and FIG. 3 is a side view of the mobile robot in accordance with one embodiment of the present invention.

Referring to FIGS. 1 to 3, a mobile robot 1 in accordance with one embodiment of the present invention may include a main body 10 which forms an external appearance of the mobile robot 1 and accommodates various parts therein.

The main body 10 may be extended in the vertical direction, and have an overall roly-poly toy shape which becomes gradually slimmer in the upward direction from the bottom.

The main body 10 may include a case 30 which forms the external appearance of the mobile robot 1. The case 30 may include a top cover 31 disposed at the upper portion thereof, a first middle cover 32 disposed under the top cover 31, a second middle cover 33 disposed under the first middle cover 32, and a bottom cover 34 disposed under the second middle cover 33. Here, the first middle cover 32 and the second middle cover 33 may be formed as one middle cover.

The top cover 31 may be located at the uppermost end of the mobile robot 1, and have a hemispherical shape or a dome shape. The top cover 31 may be located at a lower height than the height of an adult human so as to easily receive instructions from a user. Further, the top cover 31 may be configured to be rotatable at a designated angle.

The top cover 31 may be disposed at the uppermost end of the mobile robot 1, accommodate various parts therein, have a shape and functions similar to those of a human head, and be in charge of interaction with the user. Therefore, the top cover 31 and the parts disposed therein may be referred to as a head. Further, a configuration of parts received in the top cover 31 or disposed outside the top cover 31 may be referred to as a head unit. Meanwhile, remaining parts disposed under the head may be referred to as a body.

The top cover 31 may include an operation unit 311 provided at one side of the front surface thereof. The operation unit 31 may have a function of receiving instructions from the user. For this purpose, the operation unit 31 may include a display 312 to receive touch input from the user.

The display 312 disposed at the operation unit 311 may be referred to as a first display or a head display 312, and a display 21 included in a display unit 20 disposed at the body may be referred to as a second display or a body display 21.

The head display 312 and a touch pad may form a layered structure, thus constructing a touch screen. In this case, the head display 312 may be used not only as an output device but also as an input device to which information may be input by user touch.

Further, the operation unit 311 may face upwards at a designated angle so that the user may easily operate the operation unit 311 while looking down at the head display 312. For example, the operation unit 311 may be disposed on a surface formed by cutting out a part of the top cover 31. Therefore, the head display 312 may be disposed so as to be sloped.

Further, the operation unit 311 may have an overall circular or oval shape. Such an operation unit 311 may be formed in a similar shape to a human face.

For example, the operation unit 311 may have a circular shape, and at least one structure to express human eyes, nose, lips, eyebrows, etc. may be located on the operation unit 311.

That is, a specific structure to express human eyes, nose, lips, eyebrows, etc. may be disposed on the operation unit 311, or the operation unit 311 may be painted with a specific colored paint. Therefore, the operation unit 311 may have a human face shape and thus provide an emotional feeling to users. Further, if a robot having a human face shape travels, the robot may give an impression of a moving person and thus repulsion toward robots may be solved.

In another example, at least one image to express human eyes, nose, lips, eyebrows, etc. may be displayed on the head display 312.

That is, not only information related to a road guidance service but also various images to express a human face shape may be displayed on the head display 312. Further, an image to show a predetermined facial expression may be displayed on the head display 312 at regular time intervals or at a specific time.

In FIG. 1, a direction in which the body display 21 faces will be defined as a "rear". Further, the opposite direction of the rear will be defined as a "front".

Further, a head camera unit 313 to recognize humans and objects may be disposed on the operation unit 311.

The head camera unit 313 may be disposed above the head display 312. The head camera unit 313 may include a 2D camera 313a and RGBD sensors 313b and 313c.

The 2D camera 313a may be a sensor to recognize humans or objects based on a 2D image.

The red, green, blue and distance (RGBD) sensors 313b and 313c may be sensors to acquire a position or a face image of a human. The RGBD sensors 313b and 313c may be sensors to detect humans or objects using captured images having depth data acquired from a camera having RGBD sensors or other similar 3D imaging devices.

In order to accurately detect the position or the face image of the human, the RGBD sensors 313b and 313c may be provided in plural. For example, two RGBD sensors 313b and 313c may be provided so that each RGBD sensor may be disposed at each of the left and right sides of the 2D camera 313a.

The head camera unit 313 may include 3D vision sensors, such as the RGBD sensors, and sense whether or not a human is present within a designated distance, whether or not a guidance target is present in a guidance mode, a distance between the human and the mobile robot 1, a moving speed of the human, etc.

Although not shown in the drawings, the operation unit 311 may further include a physical button to receive instructions directly from the user.

Further, the top cover 31 may include microphones 314.

The microphones 314 may perform a function of receiving instructions of an audio signal from the user. For example, in order to accurately receive voice instructions from the user, the microphones 314 may be formed at four points of a spot of the upper end of the top cover 31. Therefore, while the mobile robot 1 travels or the top cover 31 is rotated, a voice request for road guidance may be accurately received from the user.

In accordance with one embodiment of the present invention, the top cover 31 may be rotated so that the operation unit 311 faces in the traveling direction of the mobile robot 1 during traveling of the mobile robot 1. Further, when the mobile robot 1 receives instructions (for example: voice instructions or the like) from the user during traveling of the mobile robot 1, the top cover 31 may be rotated so that the operation unit 311 faces in a direction in which the user is located.

In contrast, when the mobile robot 1 receives instructions from the user during traveling of the mobile robot 1, the top cover 31 may be rotated in the direction opposite to the traveling direction of the mobile robot 1. That is, the top cover 31 may be rotated in a direction in which the body display unit 30 faces. Therefore, the user may effectively operate the operation unit 311 while viewing road guidance service information displayed on the body display unit 20.

Figure 4:
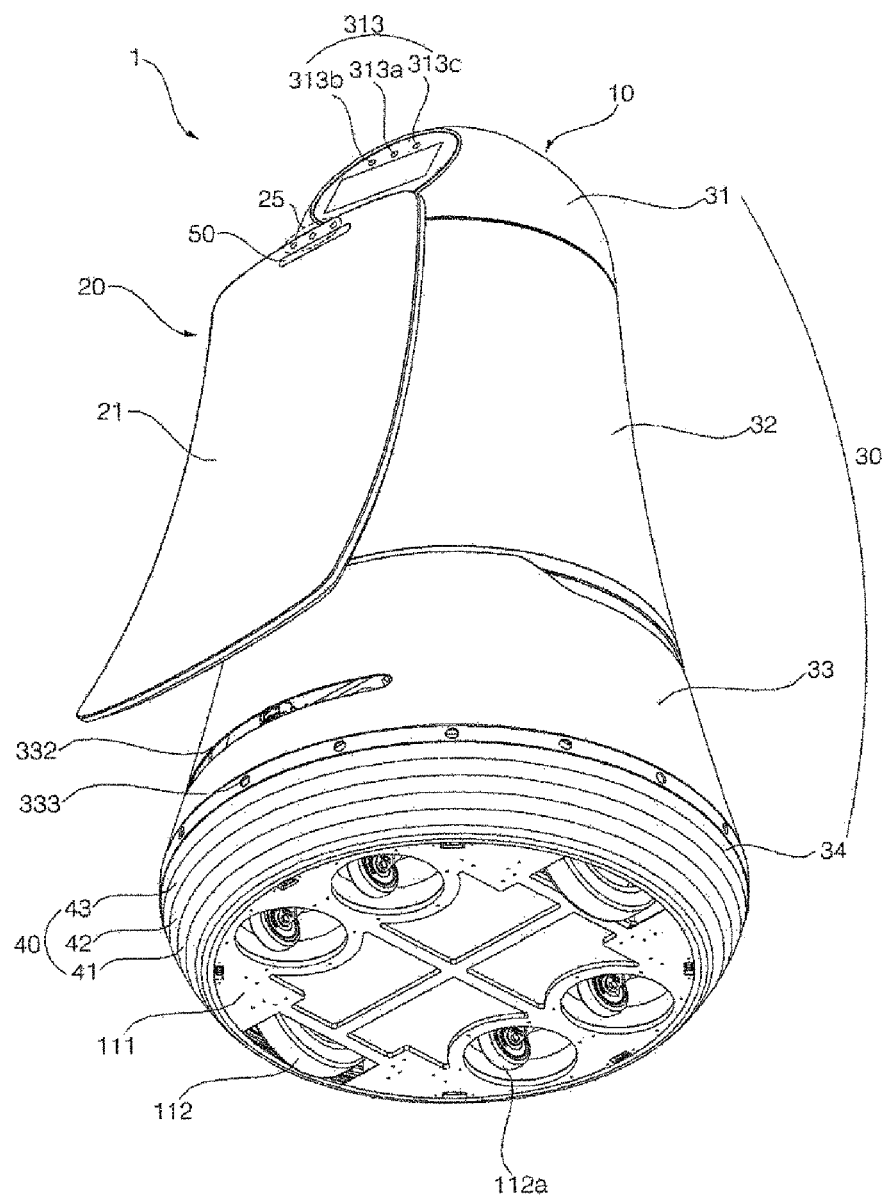
FIG. 4 is a view illustrating arrangement of displays of the mobile robot in accordance with one embodiment of the present invention.

FIG. 4 is a view illustrating arrangement of the displays 312 and 20 of the mobile robot 1 in accordance with one embodiment of the present invention.

Referring to FIG. 4, when the mobile robot 1 receives instructions from the user in an interaction state or is on standby, the displays 312 and 20 may be arranged in one direction so that the user of the mobile robot 1 or users in a public place may more easily see information displayed on the two displays 312 and 20.

The interaction state may correspond to a case in which the mobile robot 1 provides voice guidance, a menu screen, etc. to a designated user, receives touch or voice input from the user, or provides a guidance service to the user.

A direction in which the operation unit 311 faces and a direction in which the body display unit 20 faces may be opposite to each other. In this case, for example, since the operation unit 311 faces in one direction and the display unit 20 faces in the other direction opposite to the former direction, information displayed on the operation unit 311 or the body display unit 20 may be seen from both directions.

Particularly, while the mobile robot 1 travels or when the mobile robot 1 is stopped, the directions in which the operation unit 311 and the body display unit 20 face may be varied.

For example, while the mobile robot 1 travels, as exemplarily shown in FIG. 1, the directions in which the operation unit 311 and the body display unit 20 face may be opposite to each other.

Further, when the mobile robot 1 is on standby, as exemplarily shown in FIG. 4, the directions in which the operation unit 311 and the body display unit 20 face may be the same.

In addition, the top cover 31 may further include an emergency operation button 315. The emergency operation button 315 may perform a function of immediately stopping operation of the mobile robot 1 while the mobile robot 1 travels or when the mobile robot 1 is stopped. For example, the emergency operation button 315 may be located at a rear portion of the mobile robot 1 so as to be easily operated even though the mobile robot 1 travels forwards.

The first middle cover 32 may be disposed under the top cover 31. Various electronic parts including a substrate may be located in the first middle cover 32. Further, the first middle cover 32 may have a cylindrical shape, the diameter of which is gradually increased in the downward direction from the top.

More particularly, the first middle cover 32 may include an RGBD sensor 321.

The RGBD sensor 321 may perform a function of sensing collision between the mobile robot 1 and an obstacle during traveling of the mobile robot 1. For this purpose, the RGBD sensor 321 may be located in the traveling direction of the mobile robot 1, i.e., a front portion of the first middle cover 32. For example, the RGBD sensor 321 may be located at the upper end of the first middle cover 32 in consideration of the height of an obstacle or a human present in front of the mobile robot 1. However, the disclosure of the present invention is not limited thereto, and the RGBD sensor 321 may be disposed at various positions of the front portion of the first middle cover 32.

According to embodiments, the RGBD sensor 321 may be a 3D vision sensor, and sense whether or not a human is present within a designated distance, whether or not a guidance target is present in the guidance mode, a distance between the human and the mobile robot 1, a moving speed of the human, etc.

According to embodiments, the RGBD sensor 321 is not disposed at the first middle cover 32, and the head camera unit 313 may perform a function of the RGBD sensor 321.

In addition, the first middle cover 32 may further include a speaker hole 322.

The speaker hole 322 may be a hole to transmit sound emitted by a speaker to the outside. The speaker hole 322 may be formed on the outer circumferential surface of the first middle cover 32, and be provided in singular. Otherwise, a plurality of speaker holes 322 may be formed on the outer circumferential surface of the first middle cover 32 so as to be spaced apart from each other.

In addition, the first middle cover 32 may further include stereo camera holes 323.

The stereo camera holes 323 may be holes to operate a stereo camera (not shown) installed in the main body 10. For example, the stereo camera holes 323 may be formed at the lower end of the front portion of the first middle cover 32. Therefore, the stereo camera may photograph an area in front of the mobile robot 1 through the stereo camera holes 323.

The second middle cover 33 may be disposed under the first middle cover 32. A battery, a lidar device for autonomous traveling, etc. may be located in the second middle cover 33. The second middle cover 33 may have a cylindrical shape, the diameter of which is gradually increased in the downward direction from the top, in the same manner as the first middle cover 32. The outer surface of the second middle cover 33 may be connected to the outer surface of the first middle cover 32 without any staircase. That is, the outer surface of the second middle cover 33 and the outer surface of the first middle cover 32 may be connected smoothly, and thus form the neat external appearance of the mobile robot.

Further, since each of the first middle cover 32 and the second middle cover 33 has the cylindrical shape, the diameter of which is gradually increased in the downward direction from the top, the first middle cover 32 and the second middle cover 33 may have an overall roly-poly toy shape. Therefore, impact generated when the main body 10 collides with a human or an object may be mitigated.

In more detail, the second middle cover 33 may include a first cutting part 331.

The first cutting part 331 may be formed at the front portion so as to extend to the side portions of the outer circumferential surface of the second middle cover 33. The first cutting part 331 may be a part formed by cutting out the second middle cover 33 so that a front lidar device 136 which will be described below is operable.

In more detail, the first cutting part 331 may be formed by cutting out the front portion of the outer circumferential surface of the second middle cover 33 to a designated length in a radial direction. Here, the front lidar device 136 is located in the second middle cover 33. The first cutting part 331 may be formed by cutting out a portion of the outer circumferential surface of the second middle cover 33 corresponding to the position of the front lidar device 136 along the circumference of the second middle cover 33. That is, the first cutting part 331 and the front lidar device 136 may face each other. Therefore, the front lidar device 136 may be exposed to the outside by the first cutting part 331.

For example, the first cutting part 331 is formed as at an angle of 270 degrees centering on the front portion of the second middle cover 33 along the circumference of the second middle cover 33. The reason why the first cutting part 331 is formed on the second middle cover 33 is to prevent laser emitted from the front lidar device 136 from being directly radiated to eyes of an adult or a child.

In addition, the second middle cover 33 may include a second cutting part 332.

The second cutting part 332 may be formed at the rear portion so as to extent to the side portions of the outer circumferential surface of the second middle cover 33. The second cutting part 332 may be a part formed by cutting out the second middle cover 33 so that a rear lidar device 118 which will be described below is operable.

In more detail, the second cutting part 332 may be formed by cutting out the rear portion of the outer circumferential surface of the second middle cover 33 to a designated length in a radial direction. Here, the rear lidar device 118 is located in the second middle cover 33. The second cutting part 332 may be formed by cutting out a portion of the outer circumferential surface of the second middle cover 33 corresponding to the position of the rear lidar device 118 along the circumference of the second middle cover 33. Therefore, the rear lidar device 118 may be exposed to the outside by the second cutting part 332. For example, the second cutting part 332 is formed at an angle of 130 degrees centering on the rear portion of the second middle cover 33 along the circumference of the second middle cover 33.

In this embodiment, the first cutting part 331 may be spaced apart from the second cutting part 332 in the vertical direction so as not to be connected to the second cutting part 332. Further, the first cutting part 331 may be located above the second cutting part 332.

If the first cutting part 331 and the second cutting part 332 are located collinearly, a laser emitted from the lidar device of one mobile robot may be radiated to the lidar device of another mobile robot. Then, lasers emitted from the respective mobile robots interfere with each other, and thus it may be difficult to detect a correct distance. In this case, it is difficult to detect a distance between the mobile robot and an obstacle, and thus it is difficult for the mobile robot to normally travel and the mobile robot may collide with the obstacle.

In addition, the second middle cover 33 may further include ultrasonic sensors 333.

The ultrasonic sensors 333 may be sensors to measure a distance between the mobile robot 1 and an obstacle using an ultrasonic signal. The ultrasonic sensors 333 may perform a function of sensing an obstacle located close to the mobile robot 1.

For example, the ultrasonic sensors 333 may be provided in plural so as to sense obstacles in all directions which are located close to the mobile robot 1. A plurality of ultrasonic sensors 333 may be located along the circumference of the lower end of the second middle cover 33 so as to be spaced apart from each other.

The bottom cover 34 may be disposed under the second middle cover 33. Wheels 112 and casters 112a may be located in the bottom cover 34. The bottom cover 34 may have a cylindrical shape, the diameter of which is gradually decreased in the downward direction from the top, in contrast with the first middle cover 32 and the second middle cover 33. That is, the main body 10 has an overall roly-poly toy shape and may thus reduce impact applied to the robot in the event of collision, and the lower end of the main body 10 is indented and may thus prevent human feet from being caught in the wheels of the robot.

In more detail, a base 111 may be located inside the bottom cover 34.

The base 111 may form the bottom surface of the mobile robot 1.

The wheels 112 to move the mobile robot 1 may be provided on the base 111. One wheel 112 may be located at each of the left and right sides of the base 111.

Further, the casters 112a to assist movement of the mobile robot 1 may be provided on the base 111. The casters 112a may be provided in plural so as to manually move the mobile robot 1. For example, two casters 112a may be located at each of front and rear sides of the base 111.

Depending on the above-described caster structure, if the mobile robot 1 is turned off or the mobile robot 1 needs to be moved manually, the mobile robot 1 may be pushed without great effort.

Light emitting modules 40, each of which includes one or more LEDs, may be disposed on the bottom cover 34, and at least one of the light emitting modules 40 may be turned on or off according to operating states of the mobile robot. For example, at least one of the light emitting modules 40 may emit light of a designated color or flicker on and off on a designated cycle according to the operating states of the mobile robot. Further, two or more light emitting modules of the light emitting modules 40 may output light in a designated pattern according to the operating states of the mobile robot.

Each of the light emitting modules 40 may include one or more light emitting diodes as light sources. If a plurality of light sources is provided, the light sources may be arranged with a constant pitch so as to supply uniform light. The number and pitch of the light sources may be set in consideration of luminous intensity. Further, all the light sources may emit white light, or colors of light emitted by neighboring light sources may be mixed and thus produce white light.

As the light source, not only a single light emitting diode but also a light emitting diode assembly including a plurality of light emitting diodes which are disposed adjacent to each other may be used. For example, a light emitting diode assembly including red, green and blue light emitting diodes which are disposed adjacent to each other to emit light of the three primary colors may be used as the light source.

Particularly, the light emitting modules 40 may be disposed along the circumference of the bottom cover 34. For example, the light emitting modules 40 may be disposed on an arbitrary circle surrounding the circumference of the bottom cover 34.

The light emitting modules 40 are disposed on the bottom cover 34 corresponding to the lower end of the mobile robot 1, and may thus be disposed at a position much lower than the height of human eyes. Therefore, when the light emitting modules 40 continuously output specific light or flicker on and off, humans may be less dazzled.

By disposing the light emitting modules 40 so as to surround the circumference of the bottom cover 34 in the horizontal direction, humans may see light output from the light emitting modules 40 in all directions of an angle of 360 degrees.

The light emitting modules 40 are disposed on the bottom cover 34, and are thus spaced apart from the body display 21 having a large-scale screen to display a designated image. Therefore, it is possible to prevent output light of the light emitting modules 40 and an output image of the body display 21 from mutually lowering visibility of the counterparts.

Further, the light emitting modules 40 may be disposed in a plurality of rows, i.e., as a multistage structure. Therefore, visibility of light output from the light emitting modules 40 may be further increased.

For example, the light emitting modules 40 may be disposed in three rows 41, 42 and 43 having different lengths. In this case, among the three rows 41, 42 and 43, the row 41 located as the lowermost row may have the shortest length.

More particularly, the light emitting modules 40 may be disposed in a plurality of rows and columns. For example, the light emitting modules 40 may be disposed in three rows 41, 42 and 43, and each of the three rows 41, 42 and 43 may include a plurality of light emitting modules which may be independently controlled. Therefore, the light emitting modules 40 may have a plurality of rows and columns, and be disposed in an M*N matrix when the overall light emitting modules 40 are spread.

The body display unit 20 may be extended in the vertical direction at one side of the mobile robot 1.

In more detail, the body display unit 20 may include the body display 21 and a support part 22.

The body display 21 may be located at the rear portion of the first middle cover 32. The body display 21 may perform a function of outputting visual information related to a service which is provided now (for example, airport gate query information, road guidance service information, etc.).

Further, the body display 21 may include a curved display having an outwardly curved shape having designated curvature. That is, the body display 21 may have an overall concave shape. Further, the body display 21 may have a shape which is gradually more tilted towards the rear in the downward direction from the top. In other words, the body display 21 may be configured to be gradually far away from the case 30 in the downward direction from the top.

The above-described display unit structure is advantageous in that information displayed on the body display 21 may be seen well even at a position far away from the mobile robot 1, and the information displayed on the body display 21 is not distorted even at various angles.

Further, in accordance with the embodiment of the present invention, the mobile robot 1 may move in advance along a predetermined route so as to guide the user to a road. Then, the user may watch the body display unit 20 installed at the rear portion of the mobile robot 1 while moving along the mobile robot 1. That is, even if the mobile robot 1 travels so as to guide the user to the road, the user may easily see information displayed on the body display unit 20 while following the mobile robot 1.

In addition, the upper end of the body display 21 may extend to the upper end of the first middle cover 32, and the lower end of the body display 21 may extend to the second cutting part 332. In this embodiment, the lower end of the body display 21 may be formed so as not to go over the second cutting part 332. If the body display 21 is formed to cover the second cutting part 332, a laser emitted from the rear lidar device 118 collides with the lower end of the body display 21. Thereby, the mobile robot 1 may not detect a distance from an obstacle located at the rear of the mobile robot 1.

The support part 22 may perform a function of maintaining the position of the body display 21 locating at the rear portion of the first middle cover 32. The support part 22 may extend from the rear surface of the body display unit 21. The support part 22 may be formed to extend in the vertical direction on the rear surface of the body display 21, and gradually more protrude in the downward direction from the top.

Further, the support part 22 may pass through the rear surface of the first middle cover 32 and be inserted into the first middle cover 32. For this purpose, a through hole (not shown) through which the support part 22 passes may be formed at the rear portion of the middle cover 32. The through hole may be formed by cutting out a part of the rear portion of the outer circumferential surface of the first middle cover 32.

Also, the body display unit 20 may be fixed to the inside of the main body 10 by a separate fixing member 138.

The fixing member 138 to fix the body display unit 20 to the main body 10 may be provided within the main body 10. One side of the fixing member 138 may be fixed to the main body 10, and the other side of the fixing member 138 may be fixed to the body display unit 20. For this purpose, the other side of the fixing member 138 may pass through the through hole and protrude to the outside of the case 30. That is, both the support part 22 and the fixing member 138 may be located within the through hole.

In this embodiment, the body display unit 20 may be coupled to the fixing member 138 by a coupling unit. Here, the support part 22 of the body display unit 20 may be placed on the fixing member 138. In other words, the support part 22 may be placed on the fixing member 138, and a part of the fixing member 138 may be fixed to a part of the body display unit 20. By such a display unit fixing structure, the body display unit 20 may be stably located at the rear portion of the first middle cover 32.

In addition, the body display unit 20 may further include a ticket inlet 50. Although this embodiment exemplarily illustrates the ticket inlet 50 as being disposed at the body display unit 20, the present invention is not limited thereto, and the ticket inlet 50 may be disposed at other regions.

In accordance with one embodiment of the present invention, when a ticket, such as an airplane ticket, is put into the ticket inlet 50, the mobile robot 1 may scan a barcode, a QR code, etc. included in the ticket.

Further, the mobile robot 1 may display a result of scanning and provide gate information, counter information, etc. according to the result of scanning to the user through the body display unit 21.

The body display unit 20 may further include a body camera unit 25 to identify and track a guidance target.

The body camera unit 25 may include a 3D vision sensor, such as an RGBD camera sensor, and sense whether or not a human is present within a designated distance, whether or not a guidance target is present in the guidance mode, a distance between the human and the mobile robot 1, a moving speed of the human, etc.

According to embodiments, the mobile robot 1 may exclude the body camera unit 25, and further include a sensor disposed at another region to identify and track a guidance target.

Figure 5:
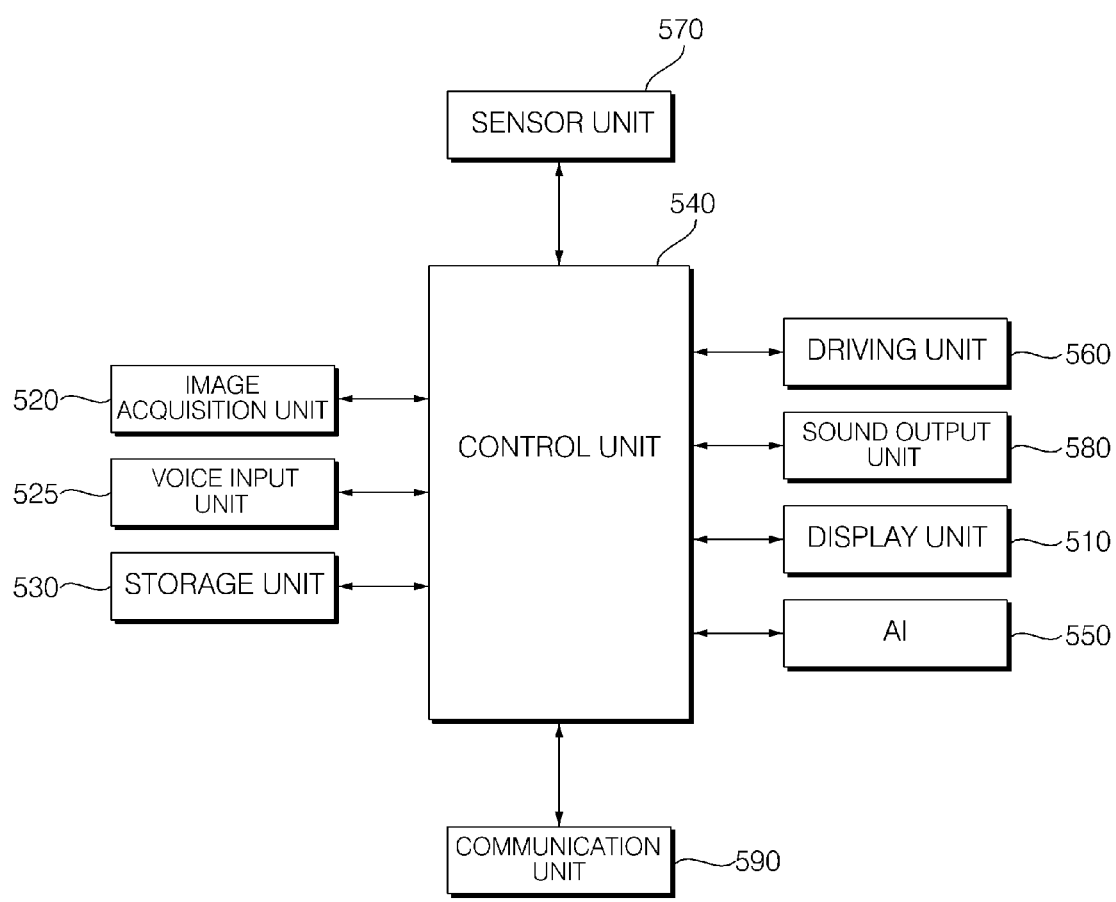
FIG. 5 is a block diagram illustrating control relations among main elements of the mobile robot in accordance with one embodiment of the present invention.

FIG. 5 is a block diagram illustrating control relations among the main elements of the mobile robot in accordance with one embodiment of the present invention.

Referring to FIG. 5, the mobile robot 1 in accordance with one embodiment of the present invention may include a voice input unit 525 to receive user's voice input through the microphones 314, a storage unit 530 to store various data, a communication unit 590 to transceive data with other electronic devices, such as a server (not shown), an artificial intelligence (AI) 550 including an artificial neural network trained through machine learning, such as deep learning, to process data, and a controller 540 to control overall operation of the mobile robot 1.

The voice input unit 525 includes a processing unit to convert analog sound into digital data or is connected to the processing unit, and may thus convert a user input voice signal into data so as to be recognized by the controller 540 or the server (not shown).

The controller 540 controls the voice input unit 525, the storage unit 530 and the communication unit 590 of the mobile robot 1, and may thus control overall operation of the mobile robot 1.

The storage unit 530 serves to record various information necessary to control the mobile robot 1, and may include a volatile or non-volatile recording medium.

Further, the storage unit 530 may store various data necessary for the mobile robot 1 to provide a guidance service.

Further, the controller 540 may transmit an operating state of the mobile robot 1 or user input to the server or the like through the communication unit 590.

The communication unit 590 includes at least one communication module and thus connects the mobile robot 1 to the Internet or a designated network.

The storage unit 530 may store data for voice recognition, and the controller 540 may process the user input voice signal received through the voice input unit 525 and perform a voice recognition process.

The controller 540 may control the mobile robot 1 to perform a designated operation based on a result of voice recognition.

For example, if the voice signal includes instructions to request designated information, such as airplane departure information, tourism information, etc., the controller 540 may control the display unit 510 to display the designated information, such as the airplane departure information, the tourism information, etc.

Further, when a user's guidance request is present, the controller 540 may escort the user to a destination to be guided, selected by the user.

The voice recognition process may be performed not by the mobile robot 1 but by the server.

In this case, the controller 540 may control the communication unit 590 to transmit the user input voice signal to the server, and receive a result of recognition of the voice signal from the server through the communication unit 590.

Otherwise, simple voice recognition, such as recognition of a wake-up word, may be performed by the mobile robot 1, and high-dimensional voice recognition, such as processing of natural language, may be performed by the server.

Further, the mobile robot 1 may include a display unit 510 to display designated information as an image, and a sound output unit to output designated information as sound.

The display unit 510 may display information corresponding to user's request input, a result of processing corresponding to the user's request input, an operation mode, an operation state, an error state, etc. as an image.

As described above referring to FIGS. 1 to 4, the display unit 510 may include the head display 312 and the body display 21. Since the body display 21 is implemented as having a larger screen than the head display 312, information may be displayed through a large screen of the body display 21.

Further, the sound output unit 580 may output warning sound, a notification message indicating the operation mode, the operation state, the error state, etc., the information corresponding to the user's request input, a result of processing corresponding to the user's request input, etc. as sound according to control of the controller 540. The sound output unit 580 may convert an electrical signal from the controller 540 into an audio signal and output the audio signal. For this purpose, the sound output unit 580 may be provided with a speaker or the like.

Further, the mobile robot 1 may include an image acquisition unit 520 to photograph a designated range.

The image acquisition unit 520 photographs the surroundings and external environment of the mobile robot 1, and may include a camera module. In order to increase photographing efficiency, a plurality of cameras may be installed at each region of the image acquisition unit.

For example, referring to FIGS. 1 to 4, the image acquisition unit 520 may include the head camera unit 313 to recognize humans and objects, and the body camera unit 25 to identify and track a guidance target. However, the number, dispositions, kinds and photographing range of cameras included in the image acquisition unit 520 are not limited thereto.

The image acquisition unit 520 may photograph an image for user recognition. The controller 540 may determine an external situation or recognize the user (the guidance target) based on the image photographed and acquired by the image acquisition unit 520.

Further, the controller 540 may control the mobile robot 1 to travel based on the image photographed and acquired by the image acquisition unit 520.

The image photographed and acquired by the image acquisition unit 520 may be stored in the storage unit 530.

The mobile robot 1 may include a driving unit 560 to move the mobile robot 1, and the driving unit 560 may move the main body 10 according to control of the controller 540.

The driving unit 560 may include at least one driving wheel 112 to move the main body 10 of the mobile robot 1. The driving unit 560 may include a driving motor (not shown) connected to the driving wheel 112 to rotate the driving wheel. The driving wheel 112 may be provided at each of left and right sides of the main body 10, and driving wheels 112 provided at the left and right sides of the main body 10 will be referred to as a left wheel and a right wheel, respectively.

The left wheel and the right wheel may be driven by one driving motor, or a left wheel driving motor and a right wheel driving motor may be respectively provided as needed. By generating a difference in rotational speeds between the left wheel and right wheel, the traveling direction of the main body 10 may be changed to the left or right.

Further, the mobile robot 1 may include a sensor unit 570 including sensors to sense various data related to the operation and state of the mobile robot 1.

The sensor unit 570 may include an infrared sensor, an ultrasonic sensor, an RF sensor, a geomagnetic sensor, a position sensitive device (PSD) sensor, a depth sensor, a time of flight (TOF) sensor, etc. The sensor unit 570 may include an obstacle detection sensor to sense an obstacle and, for example, the obstacle detection sensor may correspond to the ultrasonic sensor 333, the RGBD sensor 321, etc., which were described above referring to FIGS. 1 to 4.

In addition, the sensor unit 570 may further include a cliff detection sensor 113 to sense whether or not a cliff is present on the floor within a traveling area.

According to embodiments, the sensor unit 570 may further include a sensor to sense a volume of sound acquired through the microphones 314, and thereby, sense a volume of user's voice and a volume of ambient noise.

Otherwise, without a separate sensor, the voice input unit 525 may determine a volume of user's voice and ambient noise in the process of processing a signal acquired through the microphones 314.

Further, the sensor unit 570 may include the light detection and ranging (lidar) devices 136 and 118.

The lidar devices 136 and 118 may detect an object, such as an obstacle, based on a time of flight (TOF) between a transmitted signal and a received signal or a phase difference between a transmitted signal and a received signal, via laser light.

Further, the lidar devices 136 and 118 may detect a distance from an object, a speed of the mobile robot relative to the object, and a position of the object.

The lidar devices 136 and 118 may be provided as some of elements of the obstacle detection sensor. Further, the lidar devices 136 and 118 may be provided as sensors to construct a map.

The obstacle detection sensor senses an object, particularly, an obstacle present in the traveling (moving) direction of the mobile robot, and transmits obstacle information to the controller 540. Here, the controller 540 may control movement of the mobile robot 1 according to the sensed position of the obstacle.

The sensor unit 570 may further include a motion detection sensor which senses motion of the mobile robot 1 according to driving of the main body 101 and outputs motion information. For example, a gyro sensor, a wheel sensor, an acceleration sensor or the like may be used as the motion detection sensor.

The gyro sensor senses a rotating direction of the mobile robot 1 and detects a rotation angle of the mobile robot 1 when the mobile robot 1 moves according to the operation mode thereof. The gyro sensor detects an angular speed of the mobile robot 1 and outputs a voltage value being proportional to the angular speed. The controller 540 calculates the rotating direction and the rotation angle of the mobile robot using the voltage value output from the gyro sensor.

The wheel sensor is connected to the left wheel and the right wheel and senses RPMs of the wheels. Here, the wheel sensor may be a rotary encoder. The rotary encoder senses and outputs the RPMs of the wheels.

The controller 540 may calculate rotational speeds of the left and right wheels using the RPMs. Further, the controller 540 may calculate the rotation angle using an RPM difference between the left wheel and the right wheel.

The acceleration sensor senses change in the speed of the mobile robot 1, for example, change of the mobile robot 1 according to departure, stop, change of direction, collision with an object, etc. The acceleration sensor may be adhered to an adjacent position of a main wheel or a subsidiary wheel, and detect slip or idling of the wheel.

Further, the acceleration sensor may be installed in the controller 540 and sense change in the speed of the mobile robot 1. That is, the acceleration sensor detects an impulse according to change in the speed of the mobile robot 1 and outputs a voltage value corresponding to the impulse. Therefore, the acceleration sensor may perform a function of an electronic bumper.

The controller 540 may calculate change in the position of the mobile robot 1 based on the motion information output from the motion detection sensor. Such a position of the mobile robot serves as a relative position, as compared to an absolute position using image information. The mobile robot may improve performance in position recognition using image information and obstacle information through recognition of such a relative position.

The AI 550 may be trained through machine learning, such as deep learning, and process information. For example, AI 550 may be trained to recognize human actions.

Further, the AI 550 may include one or more modules to perform at least one of learning, inference or recognition of information.

Further, the AI 550 may control the mobile robot 1 to be operated according to a result of recognition.

Machine learning means an algorithm that computers use to perform learning through data without instructions as to a logic which a person issues to the computers, and thereby the computers themselves solve a problem.

Deep learning which is a method for teaching human's way of thinking to computers based on artificial neural networks (ANNs) to construct artificial intelligence, corresponds to artificial intelligence technology in which computers themselves perform learning like humans without human teaching.

The artificial neural networks (ANNs) may be implemented as software or hardware, such as a chip.

The AI 550 may include artificial neural networks (ANNs) in the form of trained software or hardware.

For example, the AI 550 may include deep neural networks (DNNs), such as a convolutional neural network (CNN), a recurrent neural network (RNN), a deep belief network (DBN), etc., which are trained through deep learning.

Deep learning will be described in more detail below with reference to FIGS. 10 and 11.

The AI 550 may determine human action attributes included in image data input based on weights between nodes included in the deep neural network (DNN).

The storage unit 530 may store input data to determine action attributes and data to train the deep neural network (DNN).

The storage unit 530 may store original image data acquired by the image acquisition unit 520 and sensing data acquired by the sensor unit 570.

Further, according to embodiments, the storage unit 530 may store weights and biases constructing the deep neural network (DNN).

Otherwise, according to embodiment, the weights and biases constructing the deep neural network (DNN) may be stored an embedded memory of the AI 550.

The AI 550 may, when a specific motion is performed, analyze history information representing performance of the specific motion and update conventionally learned information based on the analyzed information, through machine learning. Therefore, performance improvement may be achieved.

A deep neural network (DNN) structure, such as a convolutional neural network (CNN) structure, may be mounted in the AI 550.

The deep neural network (DNN) structure which is trained already may receive input data for recognition, recognize human action attributes included in the input data, and output a result of recognition.

Further, the AI 550 may perform data update based on data received from the external devices, such as the server, thus achieving performance improvement.

The server may generate construction of learned weights, and the server may train the deep neural network (DNN) structure using training data.

After training of the deep neural network (DNN) structure, the server may transmit updated data of the deep neural network (DNN) structure to the mobile robot 1 to achieve data update.

The controller 540 and the AI 550 may mutually transmit data to each other, and perform various control functions. The controller 540 and the AI 550 may control at least one of the elements of the mobile robot 1 based on a result of recognition.

According to embodiments, the AI 550 and the controller 540 may be understood as the same element. In this case, in the description of the present invention, the functions performed by the controller 540 may be expressed as being performed by the AI 550, and the functions performed by the AI 550 may be expressed as being performed by the controller 540.

Figure 6:
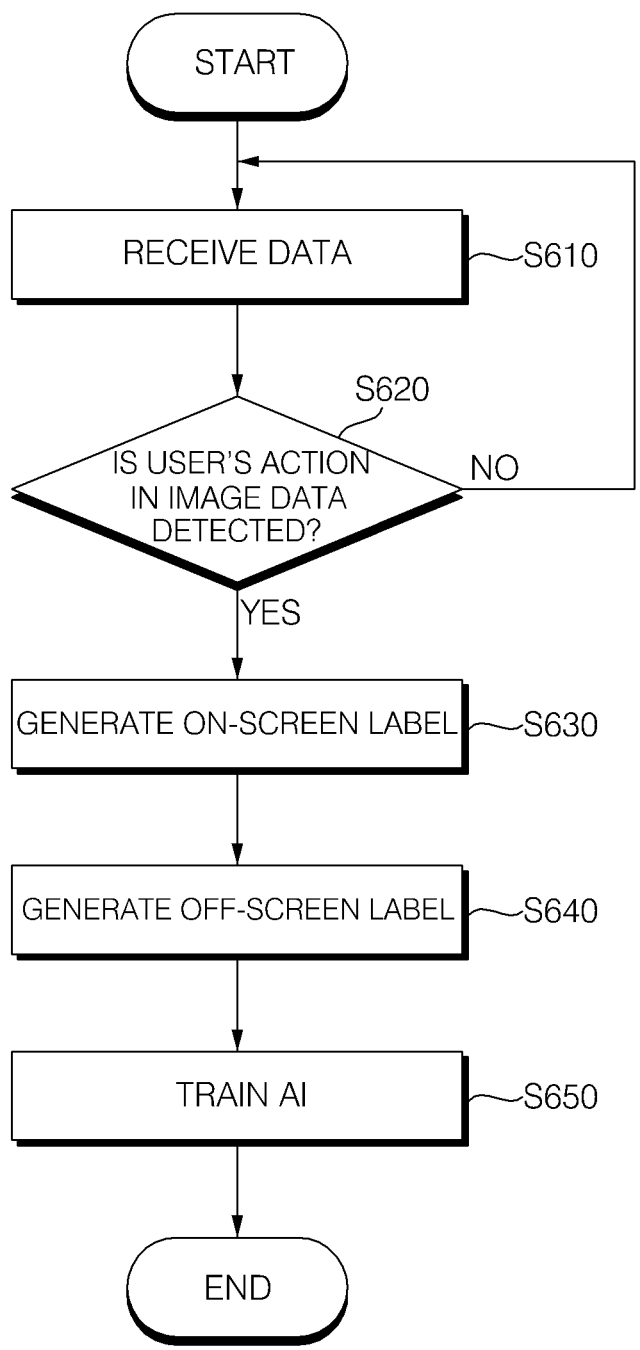
FIG. 6 is a flowchart illustrating an artificial intelligence learning method in accordance with one embodiment of the present invention.

FIG. 6 is a flowchart illustrating an artificial intelligence learning method in accordance with one embodiment of the present invention, and FIGS. 7 to 11 are reference views representing the artificial intelligence learning method and an operating method of a robot in accordance with one embodiment of the present invention.

Referring to FIG. 6, a learning module (not shown) for training of the AI 550 or the AI 550 may receive data acquired through the image acquisition unit 520 including one or more cameras and the sensor unit 570 including one or more sensors (S610). According to embodiments, the learning module for training of the AI 550 may be the controller 540.

The AI 550 or the learning module may receive image data acquired through the image acquisition unit 520 and sensing data acquired through the sensor unit 570.

According to embodiments, learning may be performed in a way that the server performs learning and the mobile robot 1 receives data regarding artificial intelligence from the server and updates the AI 550 mounted in the mobile robot 1.

If the server performs learning, the AI 550 or the learning module of the server may acquire image data acquired through image acquisition units 520 of one or more mobile robots 1 and sensing data acquired through sensor units 570.

Hereinafter, an example in which the AI 550 of the mobile robot 1 autonomously performs learning will be exemplarily described.

When a user's action is detected from image data including a user, acquired by the camera (S620), the AI 550 may generate an on-screen label based on the image data including the user (S630).

Simultaneously, the AI 550 may generate an off-screen label based on sensing data acquired through the sensor unit 570 when the image data including the user is acquired by the camera (S640).

According to embodiments, labeling of the on-screen label and the off-screen label (S630 and S640) may be performed by the learning module (not shown) for training of the AI 550.

The AI 550 or the learning module may detect the user's action by deducing vertices of respective body regions of the user included in the image data acquired by the camera through a skeleton technique (S620).

The AI 550 or the learning module may determine user's body information, such as user's height, arm length, leg length, and positions of joints, from the image of the user included in the image data.

Further, the AI 550 or the learning module may determine the user's body information using depth data sensed by the sensor unit 570.

Figure 7:
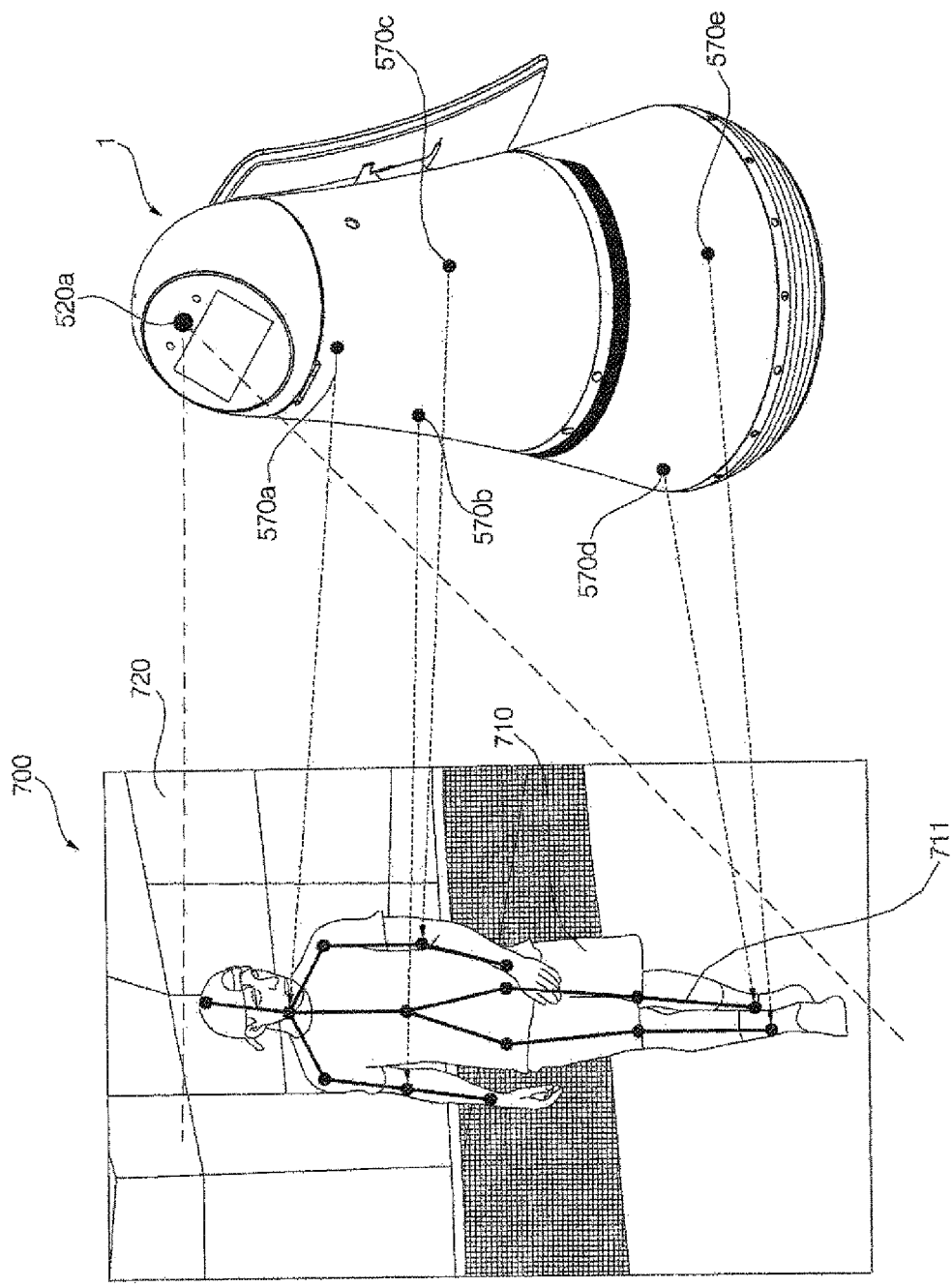
FIGS. 7 to 11 are reference views representing the artificial intelligence learning method and an operating method of a robot in accordance with one embodiment of the present invention.

FIG. 7 exemplarily illustrates sensors and a method used in detection of the user's action.

Referring to FIG. 7, the mobile robot 1 may acquire an image 700 including a user 710 through a camera 520*a*. Further, the mobile robot 1 may acquire depth data including a distance from the user and the user's image through sensors 570*a*, 570*b*, 570*c*, 570*d* and 570*e*, such as a depth sensor, a TOF sensor, etc.

The AI 550 or the learning module may extract information of the respective body regions of the user from the user's image.

For example, the AI 550 or the learning module may determine the user's body information by detecting vertices 711 of the respective body regions of the user, such as joints, through the skeleton technique and estimating user's body measurements based on the deduced vertices 711. Further, the AI 550 and the learning module may detect and recognize a user's action based on the movement of deduced vertices 711.

The AI 550 or the learning module based may determine in real time position information of main vertices of the user's body, located at the head, left shoulder, neck, right shoulder, left elbow, left wrist, right elbow, right wrist, etc., based on the data acquired through the camera 520*a* and the sensors 570*a*, 570*b*, 570*c*, 570*d* and 570*e*, and recognize the user's action through change therein.

When the user's action is detected from the image data 700 including the user 710, acquired through the camera 520*a* (S620), the AI 550 or the learning module may generate an on-screen label based on the image data 700 including the user 710 (S630).

The AI 550 or the learning module may generate a label, such as 'exercise', 'tennis' or the like, based on the image data 700 including the user 710. Such a label is based on the image data 700 acquired by the camera 520*a*, and may thus be referred to as the on-screen label.

The AI 550 or the learning module may use a background image 720 in which the user 710 is excluded from the image data 700 including the user 710, in action recognition. For example, the AI 550 or the learning module may generate an on-screen label 'tennis' corresponding to a movement of the user within the image data 700 using a result of recognition of the background image 720 indicating a tennis court.

According to embodiments, the AI 550 or the learning module may use the sensing data acquired through the sensors 570*a*, 570*b*, 570*c*, 570*d* and 570*e* together with the image data 700 including the user 710, in generation of the on-screen label. That is, the AI 550 or the learning module may more accurately recognize and label the user's action using the sensing data together with the image data 700.

Further, the AI 550 and the learning module may generate the off-screen label based on the sensing data acquired through the sensor unit 570 when the image data including the user is acquired through the camera 520a (S640).

The off-screen label may be generated based on the sensing data acquired through the sensors 570a, 570b, 570c, 570d and 570e at a moment when the image data 700 including the user 710 is acquired.

Referring to FIG. 7, by combining a result of image-based labeling, such as 'exercise', 'tennis' or the like, and sensing data at a corresponding point in time, the sensing data including no image, acquired through the sensors 570a, 570b, 570c, 570d and 570e, such as the depth sensor, the TOF sensor, etc., may be labeled with 'exercise', 'tennis' or the like.

That is, non-image-based sensing data may be classified and recognized as a designated 'action' by combining a result of image-based recognition with the non-image-based data.

According to embodiments, the AI 550 or the learning module may generate the off-screen label based on the sensing data of the sensors 570a, 570b, 570c, 570d and 570e and image data not including the user 710.

For example, the AI 550 or the learning module may classify and recognize non-image-based sensing data as a designated action based on the background image 720 and the sensing data of the sensors 570a, 570b, 570c, 570d and 570e.

That is, when the AI 550 or the learning module labels the sensing data of the sensors 570a, 570b, 570c, 570d and 570e at a corresponding point in time with 'exercise', 'tennis' or the like using a result of labeling based on the image 700 including the user 710, the AI 550 or the learning module may classify and recognize the sensing data as a designated 'action' by further combining an image not including the user 710, such as the background image 720, with the sensing data. The off-screen label may be generated based on such a result of recognition.

For this purpose, the AI 550 or the learning module may generate the image data 720 not including the user by removing image data corresponding to the user 710 from the image data 700 including the user 710.

Otherwise, the image data not including the user may be image data of the same background acquired at a different point in time from a point in time when the image data including the user is acquired. That is, an image of the tennis court at a different point in time other than the image data used in the process of image-based labeling with 'exercise', 'tennis' or the like may be used as the image data not including the user.

Further, the AI 550 or the learning module may use image data not including a designated 'action' as the image data not including the user. That is, when learning for action recognition is performed, if a user's specific action is not recognized, corresponding data may be used to generate the off-screen label.

Figure 8:
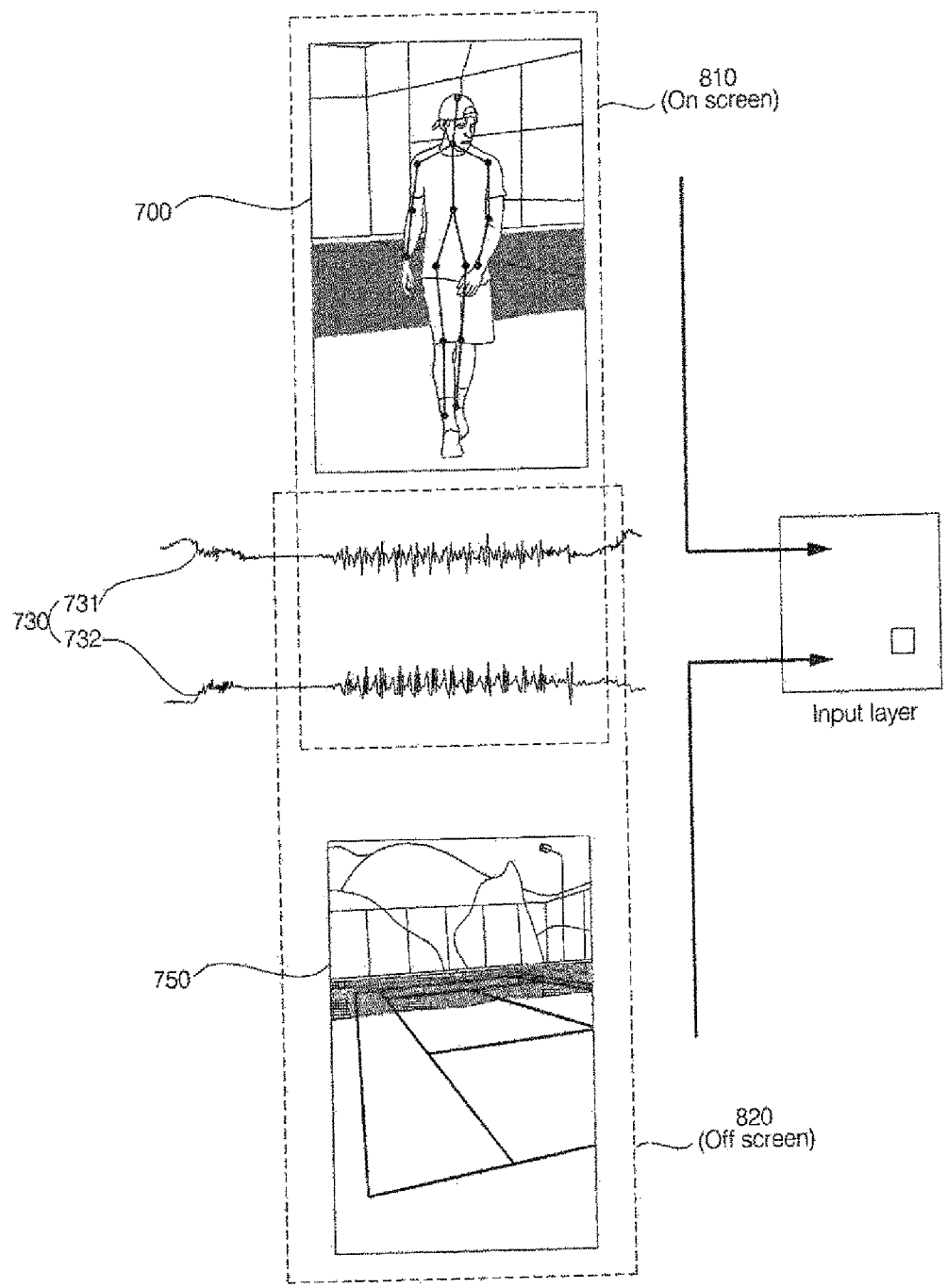

FIG. 8 is a reference view illustrating on/off-screen labels using the image 700 including the user 710 in the example of FIG. 7.

An on-screen label 810 is a label generated based on data acquired by a vision sensor, such as the camera 520a, and the on-screen label 810 serves to detect whether or not a user's action is performed using the camera 520a and the sensors 570a, 570b, 570c, 570d and 570e when the user is present in a view of the camera 520a.

For this purpose, the on-screen label 810 may use both image data 700 including the user 710 and sensing data 730 acquired through the sensors 570a, 570b, 570c, 570d and 570e.

In the on-screen label 810, the user's action may be detected by the camera 520a, and the sensing data 730 thereby may be present. Further, since the sensing data 730 includes sensing data 731 and sensing data 732 acquired through different kinds of sensors, learning may be performed based on not only the overall sensing data 730 but also the respective sensing data 731 or 732.

The off-screen label 820 is a label generated based on data acquired by non-vision sensors except for the vision sensor, such as the camera 520a, and serves to detect whether or not a user's action is performed out of the view of the camera 520a using data acquired by the camera 520a and the sensors 570a, 570b, 570c, 570d and 570e when the user is not present in the view of the camera 520a.

For this purpose, the off-screen label 820 may use sensing data 730 acquired through the sensors 570a, 570b, 570c, 570d and 570e at a point in time when the image data 700 including the user 710 is acquired.

The off-screen label 820 may be generated by combining a result of labeling based on the image data 700 including the user 710 with the sensing data 730 acquired through the sensors 570a, 570b, 570c, 570d and 570e at the point in time when the image data 700 including the user 710 is acquired.

Further, the off-screen label 820 may be generated by forcibly mapping the sensing data 730, 731 and 732 according to the user's action with image data 750 when no user's action is detected by the camera 520a.

Here, the image data 750 when no user's action is detected by the camera 520a may be image data of the same background acquired at a different point in time from the point in time when the image data 700 including the user 710 is acquired. For example, an image of the tennis court at a different point in time other than the image data used in the process of image-based labeling with 'exercise', 'tennis' or the like may be used as the image data 750 when no user's action is detected by the camera 520a.

Otherwise, the image data 750 when no user's action is detected by the camera 520a may be the background image 720 formed by removing image data corresponding to the user 710 from the image data 700 including the user 710.

Figure 9:
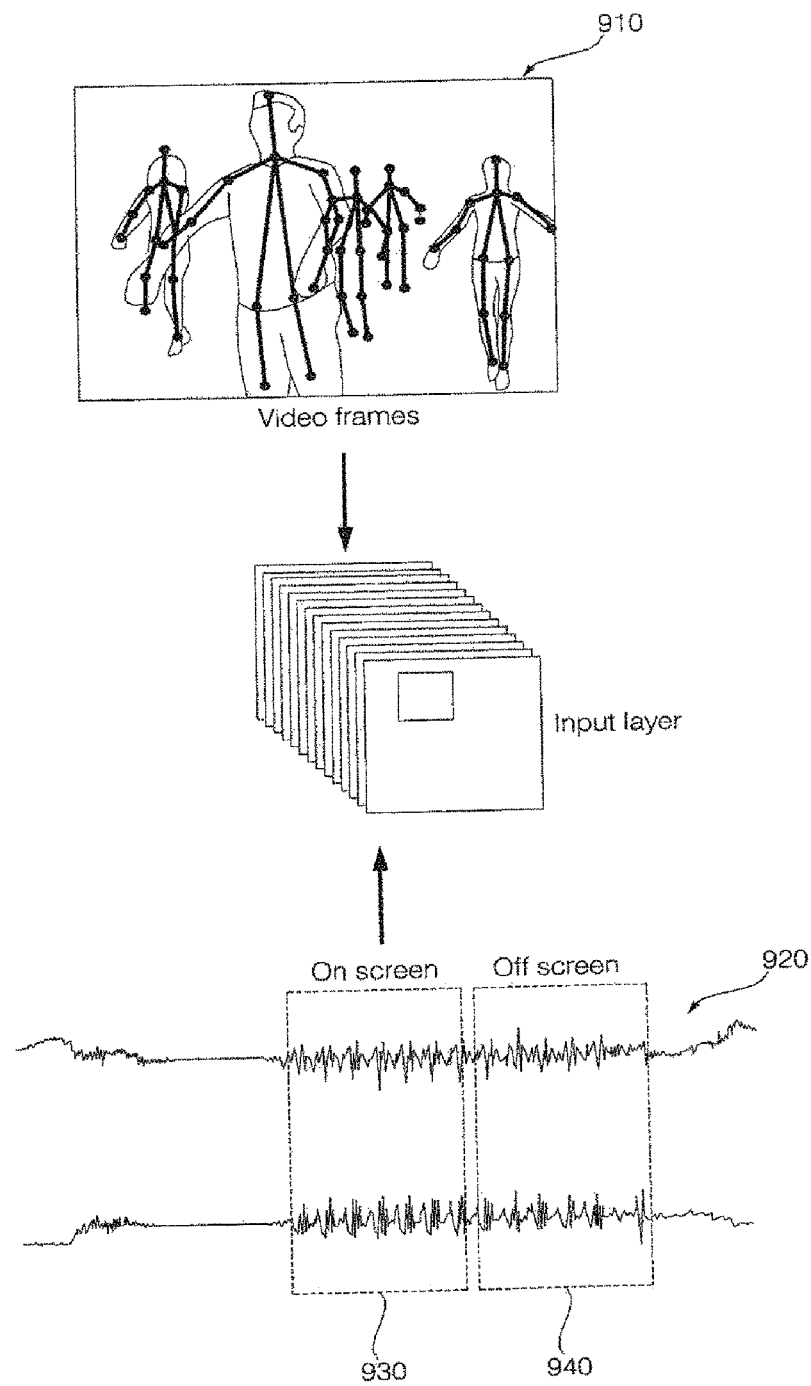

FIG. 9 is a reference view illustrating one example of on/off-screen labels.

Conventionally, there are no accurate labels (particularly, manually marked labels) for various sensors in a specific environment, and thus, it is difficult to recognize a sensor fusion-based situation/action.

Further, in case of recognition of a situation/action depending on the camera 520a, cognitive performance when a human deviates from a camera's view is greatly lowered.

Therefore, in the present invention, various sensors are used, and sensor fusion-based user's action analysis is performed so that a situation and an action may be recognized even when a human deviates from a camera's view.

For example, in a region visible through the camera 520a, user's action analysis may be performed using an on-screen label, and, in a region invisible through the camera 520a, user's action analysis may be performed using an off-screen label.

In accordance with one embodiment of the present invention, on/off-screen labels may be generated using image data 910 acquired through the camera 520a and sensing data 920 acquired through the sensors 570a, 570b, 570c, 570d and 570e.

In accordance with one embodiment of the present invention, the on/off-screen labels may be generated using self-supervised learning based on fusion of the camera 520a and the sensors 570a, 570b, 570c, 570d and 570e, and sensor patterns according to a user's action may be learned through the on/off-screen labels.

An action 'aerobic' may be recognized by analyzing the image data 910 acquired through the camera 520a, and an on-screen label 'aerobic' may be generated using the image data 910 and sensing data 930 corresponding thereto.

An off-screen label 'aerobic' may be generated using sensing data 940, acquired by copying the sensing data 930 of the on-screen label, without image data.

The off-screen label may be combined with image data when a user's action corresponding to the action 'aerobic' is not detected by the camera 520a any longer.

As circumstances require, the off-screen label may be generated using sensing data in a situation in which only noise and the background are present, when no user's action is detected by the camera 520a.

The AI 550 which recognizes human action may be trained based on the on-screen label and the off-screen label (S650).

The AI 550 or the learning module may perform machine learning, such as deep learning, using the on-screen label and the off-screen label as input data for training.

For example, the AI 550 or the learning module may perform self-supervised learning using each of the on-screen label and the off-screen label as input data.

AI-based neural networks have great variance in performance depending on accuracy of labeled data of the neural networks. Therefore, it is important to have accurate labels, and it takes a long time and great costs to prepare data having accurate labels.

However, in accordance with one embodiment of the present invention, the AI 550 or the learning module may generate labeled data, such as the on-screen label and the off-screen label, using non-labeled data. In accordance with the present invention, non-labeled data is used in artificial intelligence training through self-supervised learning, and thus time and costs may be greatly reduced.

In accordance with one embodiment of the present invention, machine learning, such as self-supervised learning, may be performed by forcibly generating the on-screen label and the off-screen label and input the on-screen label and the off-screen label into an input layer, and deep neural networks (DNNs), such as a convolutional neural network (CNN), may be trained.

Figure 10:
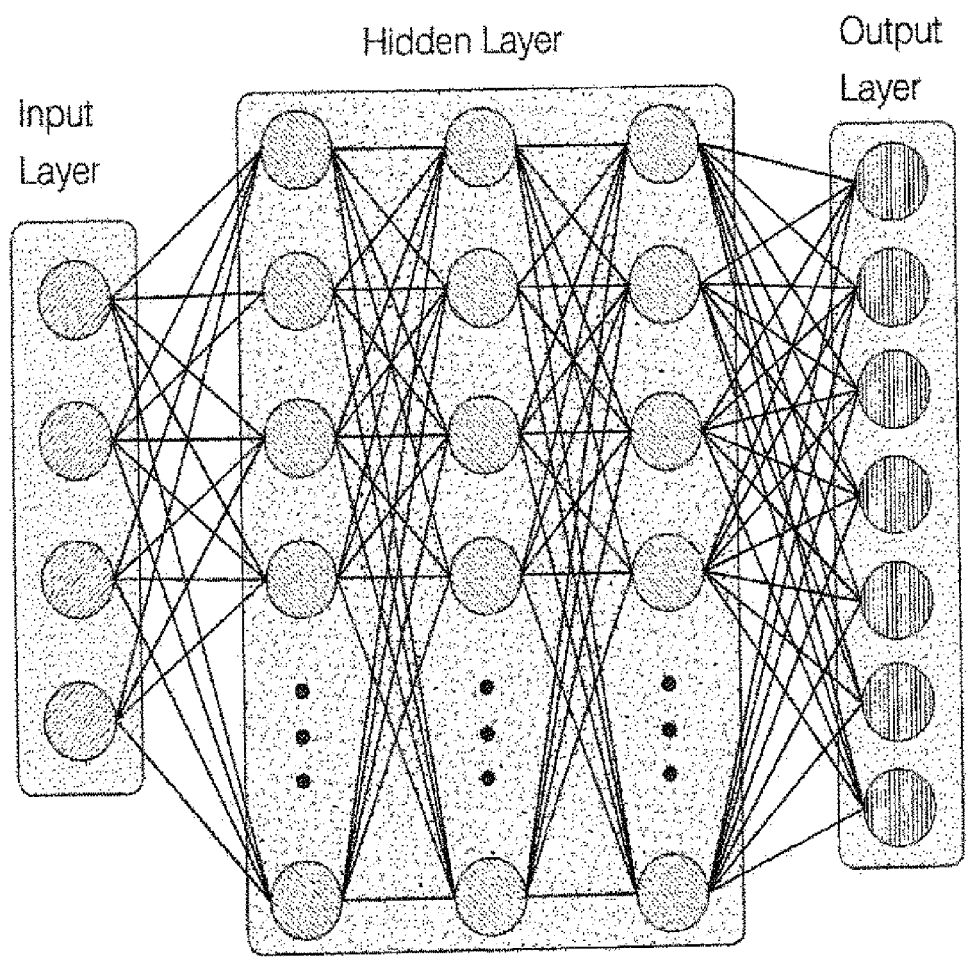
Figure 11:
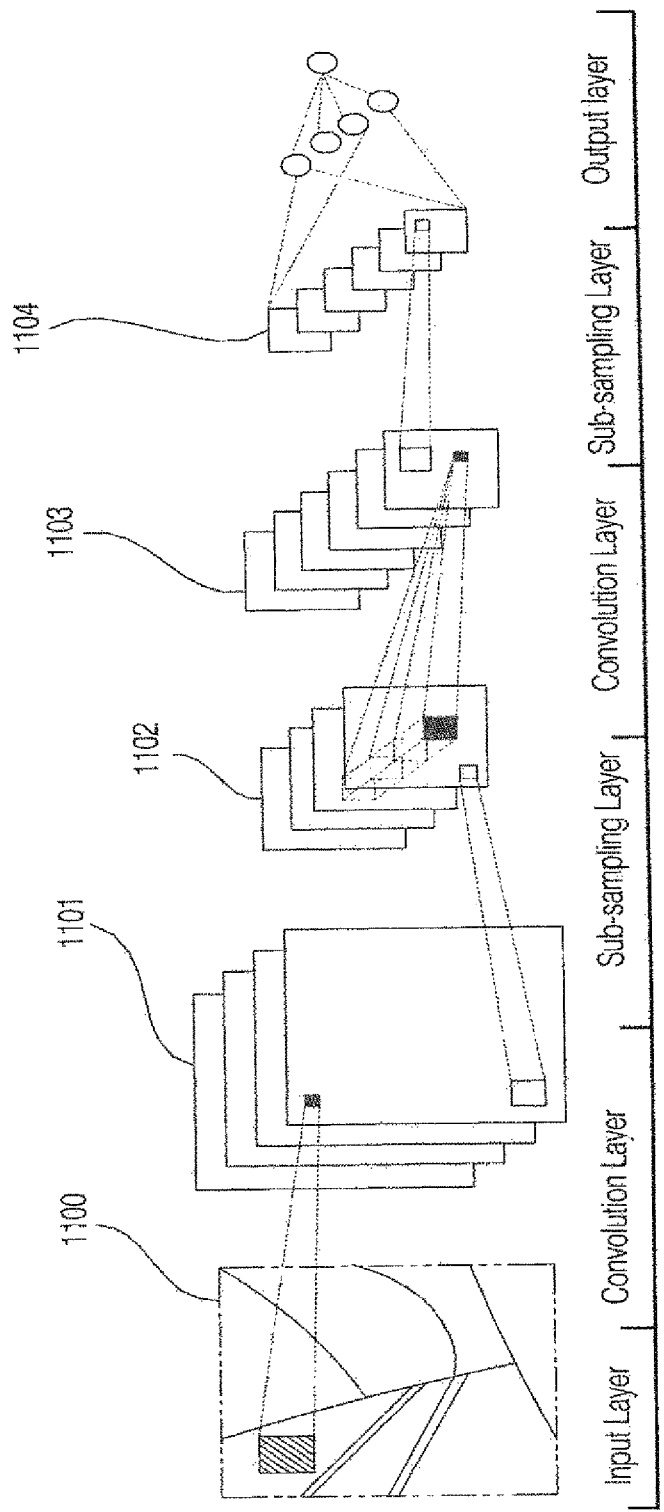

FIGS. 10 and 11 are reference views illustrating deep learning.

Deep learning, which is a kind of machine learning, is technology that deeply performs learning up to a higher level in multiple stages based on data.

Deep learning represents a set of machine learning algorithms that extract essential data from a plurality of pieces of data as a level is gradually raised.

A deep learning structure may include artificial neural networks (ANNs), and, for example, include deep neural networks (DNNs), such as a convolutional neural network (CNN), a recurrent neural network (RNN), a deep belief network (DBN), etc.

Referring to FIG. 10, the artificial neural network (ANN) may include an input layer, a hidden layer, and an output layer. Each layer includes a plurality of nodes, and each layer is connected to the next layer. Nodes of adjacent layers may have weights and be connected to each other.

A computer (machine) constructs a feature map by finding a constant pattern from input data (for example, on/off-screen labels). The computer (machine) may recognize a target by extracting lower level features, middle level features and upper level features, and output a result (for example, a result of action recognition).

The artificial neural network may perform abstraction of higher level features as it reaches the next layer.

The respective nodes may be operated based on an activation model, and an output value corresponding to an input value may be determined according to the activation model.

An output value from an arbitrary node, for example, an output value of lower level features, may be input to nodes of the next layer connected to the corresponding node, for example, nodes of middle level features. The node of the next layer, for example, the node of middle level features, may receive values output from a plurality of nodes of lower level features.

Here, input values of the respective nodes may be values acquired by applying a weight to output values of nodes of the previous layer. The weight may be an intensity of connection between the nodes.

Further, a deep learning process may be considered as a process for finding proper weights.

Furthermore, an output value from an arbitrary node, for example, an output value of middle level features, may be input to nodes of the next layer connected to the corresponding node, for example, nodes of higher level features. The node of the next layer, for example, the node of higher level features, may receive values output from a plurality of nodes of middle level features.

The artificial neural network may extract feature information corresponding to the respective levels using trained layers corresponding to the respective levels. The artificial neural network may recognize a designated target using feature information of the uppermost level, through sequential abstraction.

For example, in a face recognizing process by deep learning, a computer may abstract bright pixels and dark pixels from an input image according to pixel brightness, abstract simple shapes, such as borders, edges, etc., and then abstract more complicated shapes and objects. Finally, the computer may recognize a shape prescribing a human face.

A deep learning structure in accordance with the present invention may use various known structures. For example, the deep learning structure in accordance with the present invention may be a convolutional neural network (CNN), a recurrent neural network (RNN), a deep belief network (DBN), or the like.

The recurrent neural network (RNN) which is used to process natural language, or the like, is effective in processing of time-series data changed as time passes, and may construct an artificial neural network structure by stacking a layer at each moment.

The deep belief network (DBN) is a deep learning structure constructed by stacking restricted Boltzman machines (RBMs) corresponding a deep learning technique into multiple layers. When a designated number of layers is constructed by repeating RBM learning, the deep belief network (DBN) having the corresponding number of layers may be constructed.

The convolutional neural network (CNN) is a structure which is most commonly used particularly in object recognition, and will be described below with reference to FIG. 11.

The convolutional neural network (CNN) is a model mimicking functions of a human brain, which is constructed based on the assumption that, when a human recognizes an object, the human brain extracts fundamental features of the object, performs a complex mathematical operation, and recognizes the object based on a result of the complex mathematical operation.

FIG. 11 is a view illustrating a convolutional neural network (CNN) structure.

The convolutional neural network (CNN) may include an input layer, hidden layers, and an output layer.

Designated input data 1100 is input to the input layer.

Referring to FIG. 11, the hidden layers may be provided in plural, and include convolution layers and sub-sampling layers.

In the convolutional neural network (CNN), various filters to extract features of an image through a mathematical operation called convolution and pooling or a non-linear activation function to add non-linear characteristics are basically used together.

Convolution is mainly used in filter operation in image processing, and is used to implement filters to extract features from an image.

For example, when convolution of an overall image is repeatedly performed while moving a 3×3 window, a proper result may be acquired according to weight values of the window.

The convolution layers may be used to perform convolution filtering in which information extracted from the previous layer is filtered out using filters having a predetermined size.

The convolution layers perform convolution of input data 1100 and 1102 using the convolution filters, and create feature maps 1101 and 1103 in which features of the input data 1100 are expressed.

As a result of convolution filtering, a number of filtered images corresponding to the number of the filters included in the convolution layer may be created. The convolution layer may consist of nodes included in the filtered images.

Further, each of the sub-sampling layers paired with the convolution layers may include the same number of feature maps as the corresponding convolution layer.

The sub-sampling layers reduce the dimensions of the feature maps 1101 and 1103 through sampling or pooling.

The output layer recognizes the input data 1100 by combining various features expressed in the feature maps 1104.

An obstacle recognition module of a mobile robot in accordance with the present invention may use the above-described various deep learning structures. For example, a convolutional neural network (CNN) structure which is most commonly used in recognition of an object in an image may be used, without being limited thereto.

Further, training of an artificial neural network may be performed by adjusting weights of connection lines between nodes so that desired output to given input is caused. Further, the artificial neural network may continuously update the weight values by training. Moreover, methods, such as back propagation, may be used in training of the artificial neural network.

After training, when the AI 550 receives data for recognition, the AI 550 may recognize a specific action from the data for recognition and output a result of recognition.

If the data for recognition includes image data including the user acquired by the camera 520a, the AI 550 may recognize a user's action based on the on-screen label. That is, the AI 550 may recognize an action inside an image based on the image.

If the data for recognition does not include image data including the user acquired by the camera 520a, the AI 550 may recognize a user's action based on the off-screen label. That is, the AI 550 may recognize an action outside an image based on non-image-based sensing data.

The AI 550 in accordance with one embodiment of the present invention may recognize the user's action based on the image, i.e., the on-screen label, when data for recognition including the user is received. Further, the AI 550 in accordance with one embodiment of the present invention may recognize the user's action based on the non-image-based sensing data, i.e., the off-screen label, when data for recognition which does not include image data not including the user, such as sensing data other than image data or image data not including the user, is received.

In accordance with one embodiment of the present invention, only sensing data matched with an image may be matched with a label corresponding to a designated action, and thus, after training, actions may be more accurately recognized using both the image data and the sensing data. Further, action recognition is possible using only the sensing data.

The robot in accordance with one embodiment of the present invention, such as the mobile robot 1 providing a guidance service, a security robot (not shown) providing a security service, a home robot (not shown) communicating with a user at home, or the like, may use the artificial intelligence and the learning method using the same described above with reference to FIGS. 6 to 11. Hereinafter, operation of the robot in accordance with the present invention, for example, the mobile robot 1 providing a guidance service, will be described.

Figure 12:
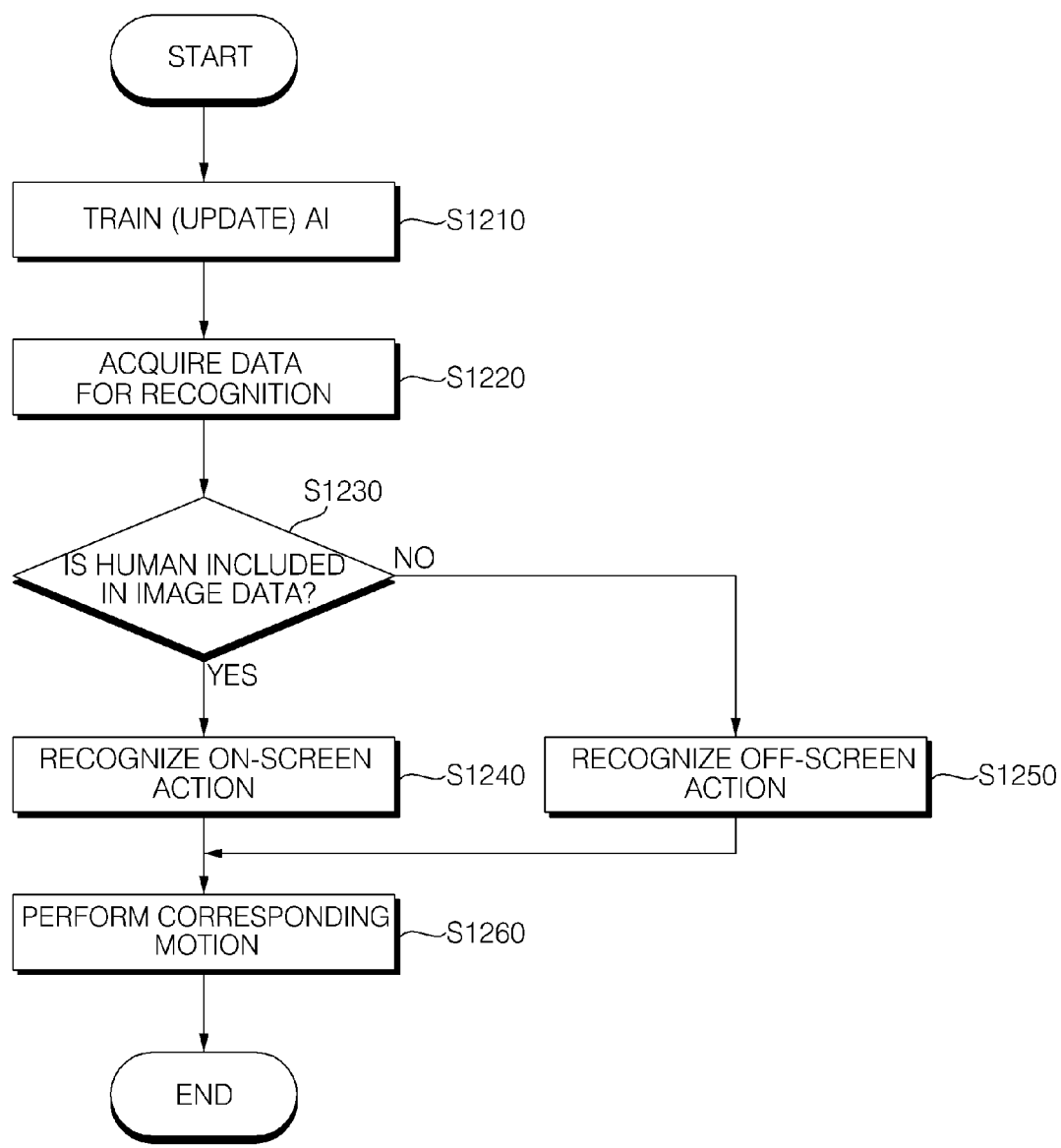
FIG. 12 is a flowchart illustrating the operating method of the robot in accordance with the one embodiment of the present invention.
Figure 13:
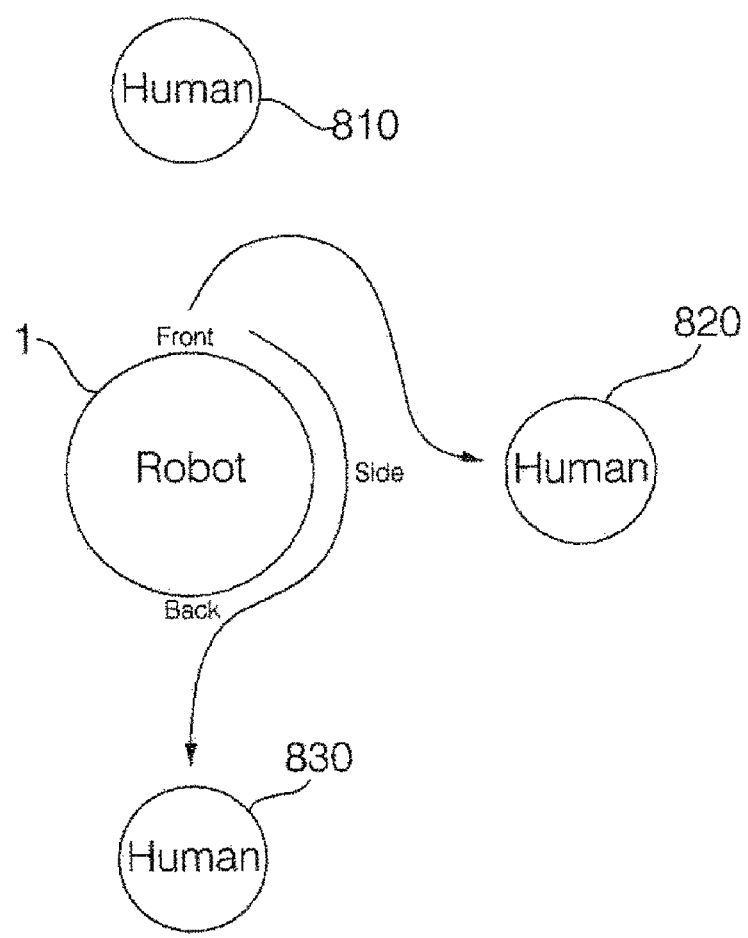
FIG. 13 is a reference view representing the operating method of the robot in accordance with the one embodiment of the present invention.

FIG. 12 is a flowchart illustrating the operating method of the robot in accordance with the one embodiment of the present invention, and FIG. 13 is a reference view representing the operating method of the robot in accordance with the one embodiment of the present invention.

The robot 1 in accordance with one embodiment of the present invention may include an artificial intelligence trained through machine learning, such as deep learning.

The robot 1 in accordance with one embodiment of the present invention may train the artificial intelligence using an on-screen label generated based on image data including a user and an off-screen label generated based on sensing data acquired by other sensors when the image data including the user is acquired by the camera 520a (S1210).

Training of the artificial intelligence (S1210) may be performed in a manner that self-supervised learning is performed using each of the on-screen label and the off-screen label as input data.

Otherwise, training of the artificial intelligence (S1210) may be performed in a manner that the artificial intelligence is updated by receiving AI-related data acquired by performing self-supervised learning using each of the on-screen label and the off-screen label as input data.

Thereafter, the robot 1 may acquire data for recognition through at least one of the camera 520a of the image acquisition unit 520 and the various sensors 5701, 570b, 570c, 570d and 570e of the sensor unit 570 (S1220).

If the data for recognition includes image data including the user acquired by the camera 520a (Yes in S1230), the robot 1 may recognize an action of the user based on the on-screen label (S1240).

If the data for recognition does not include the image data including the user acquired by the camera 520*a* (No in S1230), the robot 1 may recognize an action of the user based on the off-screen label (S1250).

The robot 1 in accordance with the present invention may recognize an action of the user using different labels according to kinds of the data for recognition. For example, the robot 1 may recognize the user's action based on the image-based on-screen label when the data for recognition is image-based input data, and recognize the user's action based on the off-screen label when the data for recognition is not image-based input data.

Further, even when the image-based input data is used, the user's action may be recognized using different labels according to image contents. For example, the robot 1 may recognize the user's action based on the image-based on-screen label when the data for recognition is image data including the user, and recognize the user's action based on the off-screen label when the data for recognition is image data not including the user.

Thereby, even a user's action deviating from a camera's view may be recognized using various sensing data. For example, a user's action which is performed in the opposite direction to a direction in which the camera faces may be recognized.

When the user's action is recognized (S1240 and S1250), the robot 1 may perform a corresponding motion based on the recognized action (S1260).

For example, based on the user's action using the off-screen label, the top cover 31 of the robot 1 may be rotated so that one surface of the top cover 31 provided with the operation unit 311 and the first display 312 disposed thereon faces the recognized user.

Thereby, after the top cover is rotated so that one surface thereof provided with the operation unit 311 and the first display 312 disposed thereon faces the user deviating from the camera's view, interaction may be started.

Otherwise, based on the action recognized using the off-screen label, the top cover 31 and the main body 10 of the robot 1 may be rotated so that one surface of the top cover 31 provided with the operation unit 311 and the first display 312 and the second display 21 having a greater size than the first display face the recognized user.

Thereby, after the top cover and the main body are rotated so that one surface of the top cover provided with the operation unit 311 and the first display 312 and the second display 21 face the user deviating from the camera's view, interaction may be started.

Referring to FIG. 13, the mobile robot 1 providing information, a guidance service, etc. through interaction with humans may interact with humans standing or approaching in several directions.

In general, it is difficult to recognize an action of a human located in a direction deviating from a camera's view. However, in accordance with the present invention, an action of a human located in a direction deviating from the camera's view may be recognized using the off-screen label.

In accordance with one embodiment of the present invention, according to whether or not a human approaches the mobile robot 1 or human actions, the mobile robot 1 may be induced to be used, or be moved and rotated to face the corresponding human so as to interact with the human.

Referring to FIG. 13, an action of a human 810 standing or approaching in front of the mobile robot 1 may be recognized by the trained artificial intelligence using an on-screen label generated based on an image including the human 810 acquired through the camera 520*a*.

Actions of users 820 and 830 standing or approaching at one side and at the back of the mobile robot 1 may be recognized by the trained artificial intelligence using an off-screen label.

Further, after one surface of the top cover provided with the operation unit 311 and the first display 312 is rotated to face a user located in a direction deviating from a camera's view, the mobile robot 1 may start interaction with the user.

Otherwise, after one surface of the top cover provided with the operation unit 311 and the first display 312 and the main body provided with the second display 21 are rotated to face a user located in a direction deviating from a camera's view, the mobile robot 1 may start interaction with the user.

Therefore, the mobile robot 1 may autonomously determine a target to interact therewith without addition of separate elements, improve convenience of use, and increase opportunity for use.

In accordance with the present invention, a user's action may be recognized without labels for data of various sensors. Particularly, the user's action may be recognized by distinguishing information inside a camera image and information outside the camera image.

Therefore, movement of the mechanical elements of the robot to recognize a user's action is not restricted, and these elements may be properly moved and operated after recognition of the action.

In accordance with the present invention, using a user's action in a region which is not visible through a camera of the robot as additional information, whether or not the gaze of the robot is turned away may be determined, or members of a party may be automatically counted.

Further, in accordance with the present invention, the robot may sense and avoid an object approaching closer even during interaction with a specific user.

Moreover, in accordance with the present invention, the robot may perform a proper response, such as an action/articulation/emotion expression, etc., to the user's action.

The artificial intelligence and the robot in accordance with the present invention are not limited to the configurations and methods of the above-described embodiments, and all or some of the respective embodiments may be selectively combined so that the embodiments may be variously modified.

Further, although the drawings illustrate operations in a specific order, it will be understood that these operations are not always performed in this order or sequence or all the operations are not always performed so as to produce desired results. In a specific case, multitasking or parallel processing may be advantageous.

The above-described artificial intelligence learning method and the operating method of the robot in accordance with one embodiment may be implemented as processor readable code in a processor readable recording medium. Processor readable recording media may include all kinds of recording media in which data readable by processors is stored. Further, the processor readable recording media may be implemented as a carrier wave, such as Internet transmission. Moreover, the processor readable recording media may be distributed to computer systems connected by a network and, herein, processor readable code may be stored and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An operating method of a robot, the operating method comprising:
   training artificial intelligence using an on-screen label generated based on image data including a user, and an off-screen label based on sensing data acquired through other sensors when the image data including the user is acquired through one or more cameras;
   acquiring data for recognition through an image acquisition unit and a sensor unit;
   recognizing a user's action based on the on-screen label, when the data for recognition comprises the image data including the user, acquired through the one or more cameras;
   recognizing the user's action based on the off-screen label, when the data for recognition does not comprise the image data including the user, acquired through the one or more cameras; and
   performing a corresponding motion based on the recognized action,
   wherein, the corresponding motion includes rotating a top cover and a main body so that one surface of the top cover provided with an operation unit and a first display disposed thereon and a second display having a larger size than the first display face the user, based on the action recognized based on the off-screen label.

2. The operating method according to claim 1, wherein, in the training the artificial intelligence:
   self-supervised learning is performed using each of the on-screen label and the off-screen label as input data; or
   the artificial intelligence is updated by receiving artificial intelligence-related data acquired by performing the self-supervised learning using each of the on-screen label and the off-screen label as the input data.

3. The operating method according to claim 1, wherein, in the performing the corresponding motion based on the recognized action, the top cover is rotated so that one surface thereof provided with the operation unit and the first display disposed thereon faces the user, based on the action recognized based on the off-screen label.

4. The operating method according to claim 1, further comprising:
   receiving data acquired through one or more cameras and one or more sensors;
   generating, when a user's action is detected from image data including the user, acquired by the one or more cameras, the on-screen label based on the image data including the user;
   generating the off-screen label based on sensing data acquired by the sensors unit when the image data including the user is acquired by the one or more cameras.

5. The operating method according to claim 4, wherein, in the generating the off-screen label, the off-screen label is generated based on the sensing data and image data excluding the user.

6. The operating method according to claim 4, further comprising generating the image data excluding the user by removing image data corresponding to the user from the image data including the user.

7. The operating method according to claim 6, wherein the image data excluding the user is image data acquired from a same background at a different point in time from a point in time when the image data including the user is acquired.

8. The operating method according to claim 5, further comprising detecting the user's action by deducing vertices of respective body regions of the user included in the image data acquired by the one or more cameras through a skeleton technique.

* * * * *